United States Patent
Hong et al.

(10) Patent No.: US 9,916,396 B2
(45) Date of Patent: Mar. 13, 2018

(54) METHODS AND SYSTEMS FOR CONTENT-BASED SEARCH

(71) Applicant: GOOGLE INC., Mountain View, CA (US)

(72) Inventors: Sun-Gi Hong, Seoul (KR); Youngchan Park, Seoul (KR)

(73) Assignee: Google LLC, Mountain View, CA (US)

( * ) Notice: Subject to any disclaimer, the term of this patent is extended or adjusted under 35 U.S.C. 154(b) by 1099 days.

(21) Appl. No.: 13/771,020

(22) Filed: Feb. 19, 2013

(65) Prior Publication Data
US 2015/0169067 A1  Jun. 18, 2015

Related U.S. Application Data

(60) Provisional application No. 61/646,184, filed on May 11, 2012.

(51) Int. Cl.
*G06F 17/30* (2006.01)
*G06F 3/0484* (2013.01)

(52) U.S. Cl.
CPC .... *G06F 17/30967* (2013.01); *G06F 3/04842* (2013.01)

(58) Field of Classification Search
CPC ......... G06F 3/0488; G06F 2203/04808; G06F 3/017; G06F 17/30244; G06F 17/30277; G06F 17/30861; G06F 17/30967; G06F 3/04842
See application file for complete search history.

(56) References Cited

U.S. PATENT DOCUMENTS

| | | | |
|---|---|---|---|
| 4,358,824 A | * | 11/1982 | Glickman ........... G06F 17/2765 |
| 5,666,502 A | | 9/1997 | Capps |
| 5,946,647 A | | 8/1999 | Miller et al. |
| 6,513,036 B2 | | 1/2003 | Fruensgaard et al. |
| 6,832,218 B1 | | 12/2004 | Emens et al. |
| 6,847,959 B1 | | 1/2005 | Arrouye et al. |
| 6,944,612 B2 | | 9/2005 | Roustant et al. |
| 7,562,076 B2 | | 7/2009 | Kapur |
| 7,565,139 B2 | | 7/2009 | Neven, Sr. et al. |

(Continued)

FOREIGN PATENT DOCUMENTS

| | | |
|---|---|---|
| CN | 101341464 A | 1/2009 |
| WO | WO 2001031479 | 5/2001 |

(Continued)

OTHER PUBLICATIONS

Marie-Catherine De Marneffe, Christopher D. Manning, "Stanford Typed Dependencies Manual," Sep. 2011,24 pages.

(Continued)

*Primary Examiner* — Jeffrey A Gaffin
*Assistant Examiner* — Mandrita Brahmachari
(74) *Attorney, Agent, or Firm* — Fish & Richardson P.C.

(57) ABSTRACT

A technique is provided for search. The technique includes providing content. The technique includes receiving gesture data from a user, wherein the gesture data reflects a selection of a substantially enclosed area of the display screen. The technique includes, in response to receiving the gesture information, determining one or more search criteria associated with content within the enclosed area, and providing data related to the one or more search criteria.

24 Claims, 15 Drawing Sheets

(56) References Cited

U.S. PATENT DOCUMENTS

| | | | |
|---|---|---|---|
| 7,614,008 B2 | 11/2009 | Ording | |
| 7,720,702 B2 | 5/2010 | Fredericks et al. | |
| 7,761,414 B2 | 7/2010 | Freedman | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 7,956,847 B2 | 6/2011 | Christie | |
| 7,974,892 B2 | 7/2011 | Fredericks et al. | |
| 8,005,720 B2 | 8/2011 | King et al. | |
| 8,086,604 B2 | 12/2011 | Arrouye et al. | |
| 8,140,361 B2 | 3/2012 | Fredericks et al. | |
| 8,286,885 B1 | 10/2012 | Zehr et al. | |
| 8,316,029 B2 | 11/2012 | Lawrence | |
| 8,429,103 B1 | 4/2013 | Aradhye et al. | |
| 8,838,562 B1* | 9/2014 | Boyen | G06F 3/0481 707/706 |
| 8,868,543 B1* | 10/2014 | Henzinger | G06F 17/30864 707/713 |
| 2001/0016067 A1* | 8/2001 | Evans | G06F 17/30253 382/176 |
| 2002/0083038 A1 | 6/2002 | Ferrari et al. | |
| 2004/0093321 A1 | 5/2004 | Roustant et al. | |
| 2005/0091106 A1* | 4/2005 | Reller | G06Q 30/02 705/14.54 |
| 2006/0026147 A1 | 2/2006 | Cone et al. | |
| 2006/0097991 A1 | 5/2006 | Hotelling et al. | |
| 2007/0260594 A1 | 11/2007 | Lewak et al. | |
| 2008/0010273 A1 | 1/2008 | Frank | |
| 2008/0126143 A1 | 5/2008 | Altman et al. | |
| 2008/0250012 A1* | 10/2008 | Hinckley et al. | 707/5 |
| 2009/0058821 A1 | 3/2009 | Chaudhri et al. | |
| 2009/0167704 A1 | 7/2009 | Terlizzi et al. | |
| 2009/0182727 A1* | 7/2009 | Majko | G06F 17/30554 |
| 2009/0224867 A1 | 9/2009 | O'Shaughnessy et al. | |
| 2010/0070448 A1 | 3/2010 | Omoigui | |
| 2011/0137883 A1 | 6/2011 | Lagad et al. | |
| 2011/0184981 A1 | 7/2011 | Lu et al. | |
| 2011/0202493 A1 | 8/2011 | Li | |
| 2011/0258006 A1 | 10/2011 | Koetting et al. | |
| 2011/0288850 A1* | 11/2011 | Shen et al. | 704/2 |
| 2012/0059745 A1 | 3/2012 | Fredericks et al. | |
| 2012/0066627 A1 | 3/2012 | Furukawa et al. | |
| 2012/0101858 A1 | 4/2012 | Depasquale et al. | |
| 2012/0101901 A1 | 4/2012 | Depasquale et al. | |
| 2012/0150572 A1 | 6/2012 | Fredericks et al. | |
| 2012/0159340 A1 | 6/2012 | Bae et al. | |
| 2012/0197857 A1* | 8/2012 | Huang et al. | 707/706 |
| 2012/0246153 A1 | 9/2012 | Pehle | |
| 2012/0294520 A1* | 11/2012 | Mei et al. | 382/164 |
| 2012/0330906 A1 | 12/2012 | Fredericks et al. | |
| 2013/0054542 A1 | 2/2013 | Ollenberger et al. | |
| 2013/0110833 A1 | 5/2013 | Fredericks et al. | |

FOREIGN PATENT DOCUMENTS

| | | |
|---|---|---|
| WO | WO 2006110480 | 10/2006 |
| WO | WO 2010120925 | 10/2010 |

OTHER PUBLICATIONS

Kao, Wayne, "Telling the Story of Friendships," Facebook, Oct. 28, 2010, available at http://blog.facebook.com/blog.php-?post=443390892130, pp. 1-2.

Dekang Lin, "Dependency-based Evaluation of MINIPAR," in Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," May 13, 2010, 14 pages.

Tripit, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Brent W. Hopkins, "Dolphin Browser HD," Washington Post, Aug. 8, 2010, 2 pages.

Ty McMahan, "Sequioa Leads $10M Series a for Mobile Browser Co. Mobotap," Press Release—Dow Jones Venture Wire, Jul. 18, 2011, Dow Jones Financial Information Services, 1 page.

Tripit, "TripIt Brings Travel Itineraries to Mobile Phones," Concur Technologies Inc., Apr. 7, 2008, available at http://www.tripit.com/press/company-announcements/tripit-brings-travel-itineraries-mobile-phones, pp. 1-2.

* cited by examiner

METHODS AND SYSTEMS FOR CONTENT-BASED SEARCH

RELATED APPLICATIONS

This application claims priority to U.S. provisional application 61/646,184, filed May 11, 2012, which is incorporated herein by reference.

BACKGROUND

The present disclosure relates to a search system. Conventional techniques for entering a search query on a user device, such as a smartphone, require a user to type search terms using either a built in mechanical keyboard or touchscreen keyboard interface. The search terms are typically displayed in a text-based search box as they are entered by the user. The search terms entered by the user are then transmitted to a remote server for processing a search query based on these search terms when a corresponding option is selected by the user, for example, a "submit" button.

SUMMARY

In some implementations, a computer-implemented method includes providing content. The method includes receiving gesture data from a user, wherein the gesture data reflects a selection of a substantially enclosed area of the display screen. The method includes, in response to receiving the gesture information, determining, using one or more computers, one or more search criteria associated with content within the enclosed area, and providing, using one or more computers, data related to the one or more search criteria. Other implementations of this aspect include corresponding systems configured to perform the actions of the methods, and computer programs encoded on computer-readable medium that when executed by one or more processors, cause the one or more processors to perform the actions of the method.

These and other implementations can each include one or more of the following features. In some implementations, the method further comprises obtaining the provided content from one or more sources remote from the user device. In some implementations, the method further comprises activating a search mode of operation prior to receiving the gesture data. In some implementations, the receiving the gesture data comprises receiving user input defining a substantially closed loop on a display screen delimiting a subset of the content displayed on the display screen. In some implementations, receiving the gesture data comprises sensing a path using a touch sensitive sensor. In some implementations, determining one or more search criteria associated with the content comprises parsing content selected from the group consisting of text, image, audio, video, and any combination thereof. In some implementations, wherein data related to search criteria comprises one or more search criteria, the method further comprises receiving a gesture indicating a search criterion selected by the user from the one or more search criteria presented to the user and obtaining search results using the search criterion selected by the user.

DETAILED DESCRIPTION OF THE FIGURES

Figure 1:
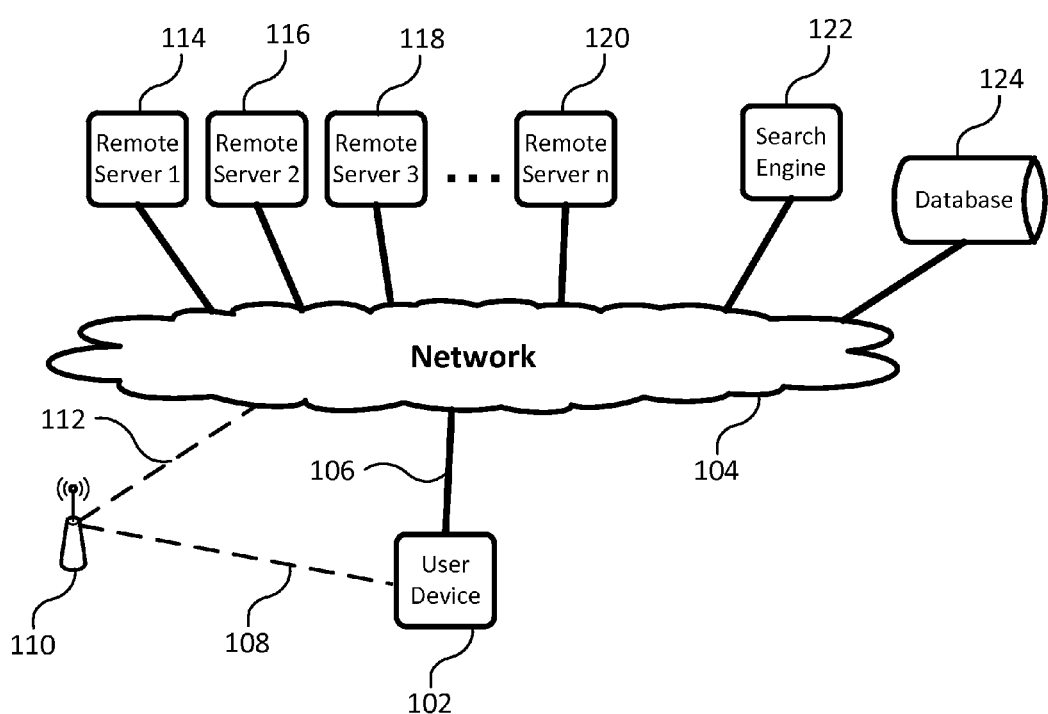
FIG. 1 shows an illustrative content-based search system in accordance with some implementations of the present disclosure.

The present disclosure is directed towards a search system that generates one or more search criteria and search results in response to gesture-based user actions and displayed content. As used herein, the term "search system" is understood to refer to any software component, hardware component (or portion thereof), or both that is used to implement any or all of the features described in the present disclosure. It will be understood that the search system may be implemented across more than one component in a single device or across more than one device in a system. For example, the search system of the present disclosure may be a stand-alone software application installed on a user device such as a personal computer, tablet device, or mobile device (e.g. smartphone). In some implementations, the search system may be partially implemented on a user device and partially implemented on a remote server. Any such suitable implementation of the search system is understood to be within the scope of the present disclosure.

In some implementations, the search system may be used by a user when the user desires to obtain additional information about content being displayed on a user device being used by the user. For example, when a user views content displayed in an application (e.g., a web browser window, a text editor display, an image file viewer, etc.), the search system may generate one or more search criteria associated with the content. For example, the search system may allow the user to draw a loop around the desired content using a finger or stylus on a touchscreen. The loop may include any desired objects such as text, video, images, audio, any other suitable objects or any combination thereof. In some implementations, a user may make two or more loops to make multiple selections.

As used herein, "gesture" refers to a movement, motion, sound, or other action that may be sensed by a sensor of a user device. The sensor may be, for example, a touchscreen, a camera, an accelerometer, a microphone, a button, other suitable sensor, or any combination thereof. For example, sensing the gesture may include receiving a line traced on a touchscreen, receiving a shake input using an accelerometer, or receiving a signal in response to activation of a button.

The search system may parse the selected content to identify search topics. As used herein, the term "topic" is understood to refer to the keywords, index terms, subject headings, descriptors, other suitable elements, or any combination thereof, that can be used to generate one or more search criteria. Topics, in the present example, may include, for example, metadata terms associated with a selected object (such as an image). Topics may include, for example, words or phrases that appear repeatedly, or that are otherwise displayed or encoded with particular characteristics that the search system may be configured to deem as important (e.g., appearing in a heading, displayed in a particular color, shape, or size, displayed in a particular location of a display, etc.). The search system may identify topics from the remainder of the content (i.e., content that has not been selected by the user).

The search system may identify or otherwise refine topics using, for example, contextual information. Contextual information may include the date, time, location, history, preferences, other users' search trends, any other suitable information defining the context of the desired search, or any combination thereof. Other users' search trends may include topics that have displayed a recent statistically significant increase in activity. The other users' search trends may or may not be mentioned in the displayed content. The search system may return one or more search criteria to the user for further refinement.

The search system may assign weights to the topics identified from the content to generate one or more search criteria. The search system may assign weights using any suitable criterion related to the user's selection of the content. The weights assigned to the topics may be different depending at least in part on, for example, how or where in the content the topics were identified, the type of object, the particular content of the topics, other suitable characteristics, or any combination thereof. In some implementations, the search system may give a relatively higher weight to the selected content than the unselected content. Related search topics and contextual information may be identified and assigned a weight. Substantially all of the content may be included in generating one or more search criteria, while the topics from the selected content are given priority. Substantially all of the content may include all of the content desired for generating one or more search criteria. For example, substantially all of the content of a webpage may include all of the text, images, and videos, except for those included in advertisements. In some implementations, substantially all of the content may include all of the content that is suitable for use in generating one or more search criteria, excluding, for example, unrecognized symbols or languages, or objects.

When identifying topics from the content, the search system may, for example, use keywords to identify topics in text. Topics may also be identified from image objects, video objects, audio objects, other non-text content (that may contain anchor text, metadata, visual information, any other suitable information, or any combination thereof), any other object or data characteristic that the search system may use to identify topics, or any combination thereof. Anchor text is embedded in the code of an image reference and may provide relevant descriptive terms about the object. Metadata may include related topics, file information, file history, captions, dialogue transcripts, timestamps, other relevant information, or any combination thereof. Visual information may include the shape, color, brightness, layout of an image or video, other relevant information, or any combination thereof. Contextual information, as described above, may be identified in relation to both text and non-text objects of the content.

In some implementations, the search system may allow the user to select, for example, an image of a movie star by giving the user the ability to draw a loop around the image. The search system may identify the name of that movie star from the image (e.g., based on corresponding anchor text). The search system may add to the identified topics the latest movie title featuring that movie star (e.g., by accessing information related to the name of the movie star in, for example, a remote relational database) as well as, for example, the name of the movie star. The search system may use the name of the movie title and the current time, date, and location of the user to generate one or more search criteria that would return the location and schedule of a movie theater nearby showing the movie.

The search system may generate one or more search criteria in response to a gesture made by the user. For example, the user shaking a user device such as a smartphone may trigger the search system to generate one or more search criteria based on the content on a display screen. The shaking may be detected by an accelerometer. The search system may assign a relatively higher weight to the topics identified from visible content on a display screen at the time of the shaking and a relatively lower weight to topics identified from the not visible content. Topics identified from related content and contextual content may also be assigned, for example, a relatively lower weight. In some implementations, the search system may display search results without further input from the user.

The search system may be implemented at the operating system level of a user device. Thus, it may be activated within a web browser, from the home screen, or from any other suitable application. It may return results in a browser application, dedicated application, or any other suitable application. For example, desired content may be selected from within a smartphone application for displaying newspaper content, and topics identified from that content may be used in part to generate one or more search criteria that may be the basis for performing a search using a web page accessed from a web browser.

The following description and accompanying FIGS. 1-16 provide additional details and features of some implementations of the search system and its underlying system.

FIG. 1 shows an illustrative search system in accordance with some implementations of the present disclosure. System 100 may include one or more user device 102. In some implementations, user device 102 includes one or more processors. In some implementations, user device 102 includes one or more computers. In some implementations, a processor includes one or more hardware processors, for example, integrated circuits, one or more software modules, computer-readable media such as memory, firmware, or any combination thereof. In some implementations, user device 102 includes one or more computer-readable medium storing software, include instructions for execution by the one or more processors for performing the techniques discussed below with respect to FIGS. 3, 9, and 11, or any other techniques disclosed herein. In some implementations, user device 102 may include a smartphone, tablet computer, desktop computer, laptop computer, personal digital assistant (PDA), portable audio player, portable video player, mobile gaming device, other suitable user device capable of providing content, or any combination thereof.

User device 102 may be coupled to network 104 directly through connection 106, through wireless repeater 110, by any other suitable way of coupling to network 104, or by any combination thereof. Network 104 may include the Internet, a dispersed network of computers and servers, a local network, a public intranet, a private intranet, other coupled computing systems, or any combination thereof.

User device 102 may be coupled to network 104 by wired connection 106. Connection 106 may include Ethernet hardware, coaxial cable hardware, DSL hardware, T-1 hardware, fiber optic hardware, analog phone line hardware, any other suitable wired hardware capable of communicating, or any combination thereof. Connection 106 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

User device 102 may be wirelessly coupled to network 104 by wireless connection 108. In some implementations, wireless repeater 110 receives transmitted information from user device 102 by wireless connection 108 and communicates it with network 104 by connection 112. Wireless repeater 110 receives information from network 104 by connection 112 and communicates it with user device 102 by wireless connection 108. In some implementations, wireless connection 108 may include cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 112 may include Ethernet hardware, coaxial cable hardware, DSL hardware, T-1 hardware, fiber optic hardware, analog phone line hardware, wireless hardware, any other suitable hardware capable of communicating, or any combination thereof. Connection 112 may include wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. Connection 112 may include may include wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 110 may include any number of cellular phone transceivers, network routers, network switches, communication satellites, other devices for communicating information from user device 102 to network 104, or any combination thereof. It will be understood that the arrangement of connection 106, wireless connection 108 and connection 112 is merely illustrative and that system 100 may include any suitable number of any suitable devices coupling user device 102 to network 104.

In some implementations, any suitable number of remote servers 114, 116, 118, 120, may be coupled to network 104. One or more search engine servers 122 may be coupled to the network 104. One or more database servers 124 may be coupled to network 104.

Figure 2:
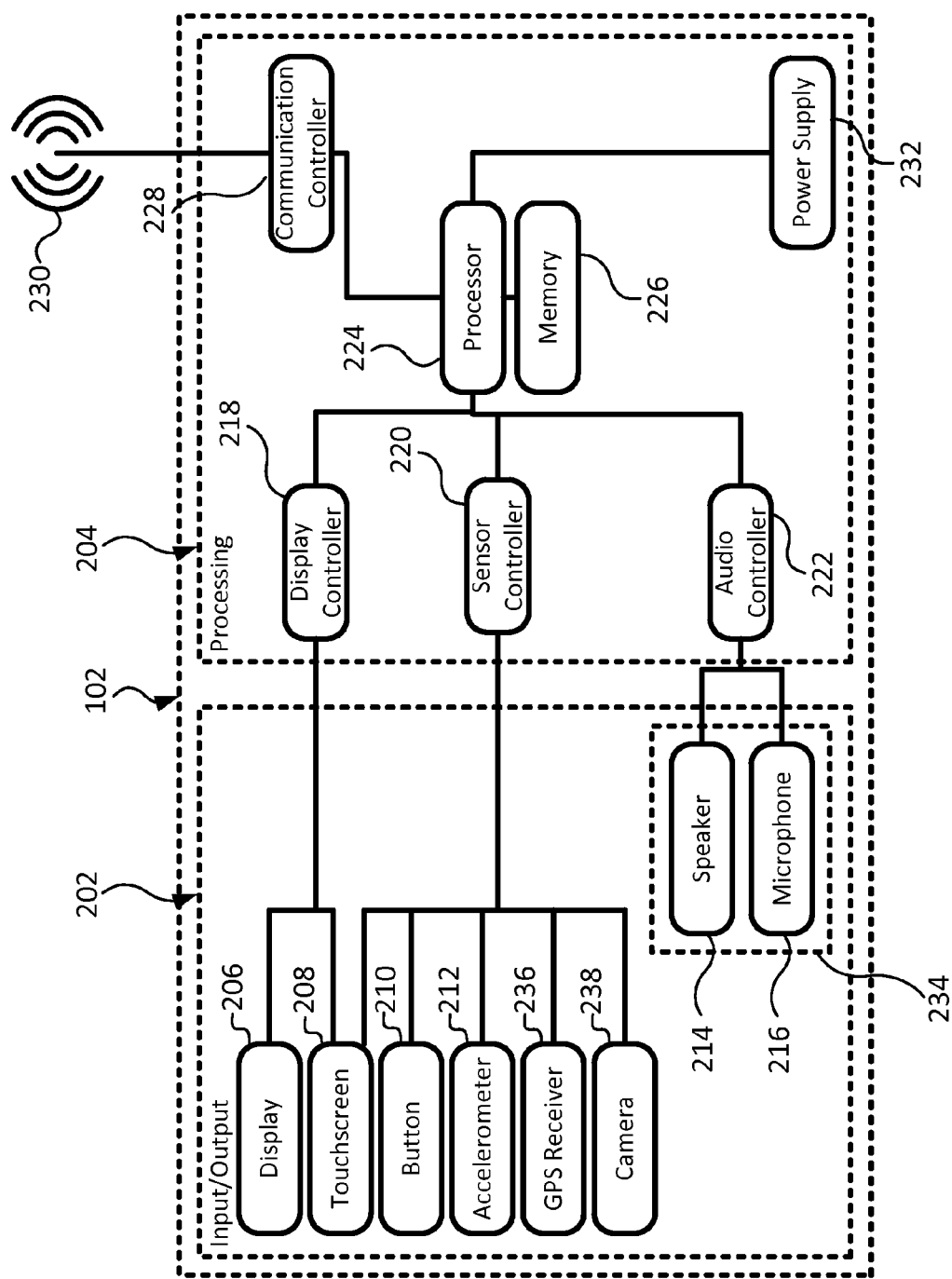
FIG. 2 is a block diagram of a user device of the content-based search system of FIG. 1 in accordance with some implementations of the present disclosure.

FIG. 2 is a block diagram of a user device of the content-based search system of FIG. 1 in accordance with some implementations of the present disclosure. User device 102 may include input/output equipment 202 and processing equipment 204. Input/output equipment 202 may include display 206, touchscreen 208, button 210, accelerometer 212, global positions system (GPS) receiver 236, camera 238, and audio equipment 234 including speaker 214 and microphone 216.

In some implementations, display 206 may include a liquid crystal display, light emitting diode display, organic light emitting diode display, amorphous organic light emitting diode display, plasma display, cathode ray tube display, projector display, any other suitable type of display capable of displaying content, or any combination thereof. Display 206 may be controlled by display controller 218 or by processor 224 in processing equipment 204, by processing equipment internal to display 206, by other controlling equipment, or by any combination thereof.

Touchscreen 208 may include a sensor capable of sensing pressure input, capacitance input, resistance input, piezoelectric input, optical input, acoustic input, any other suitable input, or any combination thereof. Touchscreen 208 may be capable of receiving touch-based gestures. Received gestures may include information relating to one or more locations on the surface of touchscreen 208, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 208 may be optically transparent and located above or below display 206. Touchscreen 208 may be coupled to and controlled by display controller 218, sensor controller 220, processor 224, any other suitable controller, or any combination thereof.

In some embodiments, a gesture received by touchscreen 208 may cause a corresponding display element to be displayed substantially concurrently (i.e., immediately following or with a short delay) by display 206. For example, when the gesture is a movement of a finger or stylus along the surface of touchscreen 208, the search system may cause a visible line of any suitable thickness, color, or pattern indicating the path of the gesture to be displayed on display 206.

Button 210 may be one or more electromechanical push-button mechanism, slide mechanism, switch mechanism, rocker mechanism, toggle mechanism, other suitable mechanism, or any combination thereof. Button 210 may be included in touchscreen 208 as a predefined region of the touchscreen (e.g., soft keys). Button 210 may be included in touchscreen 208 as a region of the touchscreen defined by the search system and indicated by display 206. Activation of button 210 may send a signal to sensor controller 220, processor 224, display controller 220, any other suitable processing equipment, or any combination thereof. Activation of button 210 may include receiving from the user a pushing gesture, sliding gesture, touching gesture, pressing gesture, time-based gesture (e.g., based on the duration of a push), any other suitable gesture, or any combination thereof.

Accelerometer 212 may be capable of receiving information about the motion characteristics, acceleration characteristics, orientation characteristics, inclination characteristics and other suitable characteristics, or any combination thereof, of user device 102. Accelerometer 212 may be a mechanical device, microelectromechanical (MEMS) device, nanoelectromechanical (NEMS) device, solid state device, any other suitable sensing device, or any combination thereof. In some implementations, accelerometer 212 may be a 3-axis piezoelectric microelectromechanical integrated circuit which is configured to sense acceleration, orientation, or other suitable characteristics by sensing a change in the capacitance of an internal structure. Accelerometer 212 may be coupled to touchscreen 208 such that information received by accelerometer 212 with respect to a gesture is used at least in part by processing equipment 204 to interpret the gesture.

Global positioning system (GPS) receiver 236 may be capable of receiving signals from global positioning satellites. In some implementations, GPS receiver 236 may receive information from one or more satellites orbiting the earth, the information including time, orbit, and other information related to the satellite. This information may be used to calculate the location of user device 102 on the surface of the earth. GPS receiver 236 may include a barometer (not shown) to improve the accuracy of the location. GPS receiver 236 may receive information from other wired and wireless communication sources regarding the location of user device 102. For example, the identity and location of nearby cellular phone towers may be used in place of, or in addition to, GPS data to determine the location of user device 102.

Camera 238 may include one or more sensors to detect light. In some implementations, camera 238 may receive video images, still images, or both. Camera 238 may include a charged coupled device (CCD) sensor, a complementary metal oxide semiconductor (CMOS) sensor, a photocell sensor, an IR sensor, any other suitable sensor, or any combination thereof. In some implementations, camera 238 may include a device capable of generating light to illuminate a subject, for example, an LED light. Camera 238 may communicate information captured by the one or more sensor to sensor controller 220, to processor 224, to any other suitable equipment, or any combination thereof. Camera 238 may include lenses, filters, and other suitable optical equipment. It will be understood that user device 102 may include any suitable number of camera 238.

Audio equipment 234 may include sensors and processing equipment for receiving and transmitting information using acoustic or pressure waves. Speaker 214 may include equipment to produce acoustic waves in response to a signal. In some implementations, speaker 214 may include an electroacoustic transducer wherein an electromagnet is coupled to a diaphragm to produce acoustic waves in response to an electrical signal. Microphone 216 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by user device 102.

Speaker 214 and microphone 216 may be contained within user device 102, may be remote devices coupled to user device 102 by any suitable wired or wireless connection, or any combination thereof.

Speaker 214 and microphone 216 of audio equipment 234 may be coupled to audio controller 222 in processing equipment 204. This controller may send and receive signals from audio equipment 234 and perform pre-processing and filtering steps before transmitting signals related to the input signals to processor 224. Speaker 214 and microphone 216 may be coupled directly to processor 224. Connections from audio equipment 234 to processing equipment 204 may be wired, wireless, other suitable arrangements for communicating information, or any combination thereof.

Processing equipment 204 of user device 102 may include display controller 218, sensor controller 220, audio controller 222, processor 224, memory 226, communication controller 228, and power supply 232.

Processor 224 may include circuitry to interpret signals input to user device 102 from, for example, touchscreen 208 and microphone 216. Processor 224 may include circuitry to control the output to display 206 and speaker 214. Processor 224 may include circuitry to carry out instructions of a computer program. In some implementations, processor 224 may be an integrated electronic circuit based, capable of carrying out the instructions of a computer program and include a plurality of inputs and outputs.

Processor 224 may be coupled to memory 226. Memory 226 may include random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 218, sensor controller 220, and audio controller 222, as have been described above, may be fully or partially implemented as discrete components in user device 102, fully or partially integrated into processor 224, combined in part or in full into combined control units, or any combination thereof.

Communication interface 228 may be coupled to processor 224 of user device 102. In some implementations, communication controller 228 may communicate radio frequency signals using antenna 230. In some implementations, communication controller 228 may communicate signals using a wired connection (not shown). Wired and wireless communications communicated by communication interface 228 may use amplitude modulation, frequency modulation, bitstream, code division multiple access (CDMA), global system for mobile communications (GSM), general packet radio service (GPRS), satellite, infrared, Bluetooth, Wi-Fi, WiMax, any other suitable communication configuration, or any combination thereof. The functions of communication controller 228 may be fully or partially implemented as a discrete component in user device 102, may be fully or partially included in processor 224, or any combination thereof.

Power supply 232 may be coupled to processor 224 and to other components of user device 102. Power supply 232 may include a lithium-polymer battery, lithium-ion battery, NiMH battery, alkaline battery, lead-acid battery, fuel cell, solar panel, thermoelectric generator, any other suitable power source, or any combination thereof. Power supply 232 may include a hard wired connection to an electrical power source, and may include electrical equipment to convert the voltage, frequency, and phase of the electrical power source input to suitable power for user device 102. In some implementations of power supply 232, a wall outlet may provide 120 volts, 60 Hz alternating current (AC). A circuit of transformers, resistors, inductors, capacitors, transistors, and other suitable electronic components included in power supply 232 may convert the 120V AC from a wall outlet power to 5 volts at 0 Hz (i.e., direct current). In some implementations of power supply 232, a lithium-ion battery including a lithium metal oxide-based cathode and graphite-based anode may supply 3.7V to the components of user device 102. Power supply 232 may be fully or partially integrated into user device 102, or may function as a stand-alone device. Power supply 232 may power user device 102 directly, may power user device 102 by charging a battery, may provide power by any other suitable way, or any combination thereof.

Figure 3:
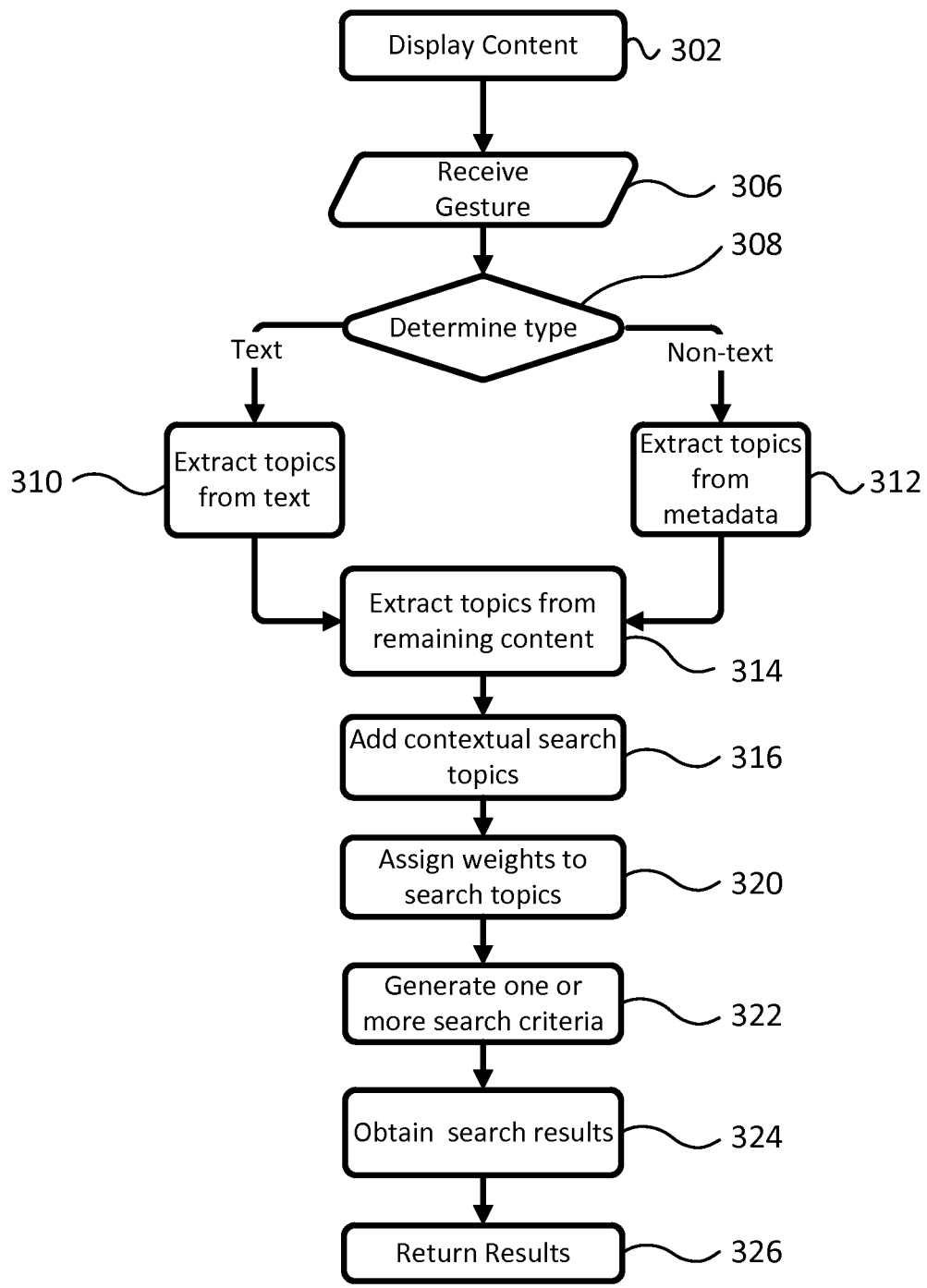
FIG. 3 is flow diagram showing illustrative steps for performing a gesture-triggered search of a selected portion of content in accordance with some implementations of the present disclosure.

FIG. 3 is flow diagram showing illustrative steps for performing a gesture-triggered search of a selected portion of content in accordance with some implementations of the present disclosure. In step 302, content is displayed on the display of the user device.

In an optional step, the content based search application activates a search mode after receiving a user input such as, for example, a signal from activation of a button, an input from a touchscreen, a voice command from a microphone, any other suitable input, or any combination thereof. In some implementations, activating the search mode reconfigures the user device such that responses to certain gestures are interpreted to relate to functionality of the content-based search application. In an example, in the search mode, a selection gesture (e.g., a gesture that serves to select particular content currently being displayed) on touchscreen 208 is interpreted as a selection of content for search, whereas while not in the search mode, the same gesture on the touchscreen may zoom, scroll, or reorient content. In some implementations, the search system may not require activation of a search mode to perform a gesture-triggered search.

In step 306, the search system receives a gesture. In some implementations, the gesture includes a selection of content on the display. In an example, a path is traced in a gesture received by a touchscreen substantially encircling a portion of content on the display. Substantially encircled, as used herein, refers to a closed or nearly closed area as defined by a gesture. In some implementations, the gesture includes a path where the two ends of the path meet, or where the path crosses itself, to define a closed area. In some implementations, the gesture includes a path where the two ends are minimally separated such that the shape may be reasonably considered to define a closed area. In some implementations, the gesture includes drawing, tapping, clicking, highlighting, any other suitable gesture indicating content, or any combination thereof.

In decision step 308, the search system analyzes one or more objects indicated by the received gesture and determine the type of the one or more objects. If the object is text, then in step 310 the search system extracts a first set of topics related to the text that may be used in generating one or more search criteria. Techniques for extracting topics from text content will be described in detail below. If the content is a non-text object, for example, image, video, audio, dynamic content, other non-text content, or any combination thereof, then in step 312 the search system extracts a second set of topics by analyzing metadata and other visual or audio information related to the content. Illustrative techniques for extracting topics from non-text content are further discussed below. In some implementations, Metadata may include related topics, file information, file history, captions, dialogue transcripts, timestamps, other relevant content, or any combination thereof. Visual information related to an object may include the shape, color, brightness, layout, other relevant information or any combination thereof. Audio information may include voice-to-text translations, language identification, waveforms, rhythm patterns, other suitable audio information, or any combination thereof. In an example, a song contains information that would allow the search system to identify, at least in part, similar songs with a similar style, tone, or rhythm. In another example, the search system translates audio dialogue from a news broadcast to text and used the text to generate one or more search criteria.

In step 314, a third set of topics is extracted from remaining content. Illustrative techniques for extracting topics from remaining content are further discussed below. The search system extracts topics from the remainder of the content that was not selected by the user in the gesture received in step 306. The remainder of the content includes text content, non-text content, or text and non-text content.

In step 316, the search system adds contextual search topics to the topics extracted from the text and non-text objects. Contextual data including, for example, the time, date, geographic location, history, and trends of other users is identified as a fourth set of topics by the search system used to generate one or more search criteria. In some implementations, the fourth set of topics includes "hot" or "rising" topics. "Hot" or "rising" topics, as used herein, indicate topics that have displayed a significant amount of activity over some time period. In an example, the search system identifies a recent movie release starring an actor in the fourth set of topics when the selected content indicates the actor's name. In some implementations, the search system identifies topics in the fourth set of topics that are not be directly related to substantial a portion of the content displayed. In an example, the search system receives an indication of the name singer's name "Lady Gaga" on a webpage primarily describing her first recorded album. In a further example, the search system identifies a recent appearance in a music award ceremony in the fourth set of topics, if that awards ceremony has received a recent increase in search traffic, regardless of the award ceremony's mention in the displayed content.

In some implementations of step 316, the search system determines the time and date from an internal clock, remote time server, other suitable source of time and date information, or any combination thereof. The search system may determine the geographic location using a global positioning system (GPS) receiver, such as, for example, GPS receiver

236 of FIG. 2. The search system may determine the geographic location using cellular tower proximity, user input, other suitable source of location information, or any combination thereof. The history may include the search history of the user, the browser history of the user, information from social media sites, trends of other users, other suitable historical information or any combination thereof. Trends of other users may include recent spikes in search trends of other users in response to current events or interest, the history of a user's friends on social networks, the history of other users near to the user at the time, as determined by geographic location, other suitable trend information, or any combination thereof. Contextual information may be provided by remote servers, the content-based search application, direct peer-to-peer communication, user input, other suitable sources, or any combination thereof.

The content based search application may process selected objects and extract topics from content, related content, and contextual information using remote servers such as servers 114, 116, 118, and 120 of FIG. 1, and database server 124 of FIG. 1. In some implementations, the remote server may divide text objects into segments such as phrases, and may identify the parts of speech of individual words. The search system may use statistical analysis, heuristic algorithms, artificial intelligence, natural language processing, machine learning, other suitable processing techniques, or any combination thereof, to extract topics from text or from textual content associated with non-text objects (e.g., metadata terms or anchor text). Processing steps for the above listed techniques may be carried out by user device 102 of FIG. 1, servers 114, 116, 118, or 120 of FIG. 1, search engine 122 of FIG. 1, database server 124 of FIG. 1, other suitable processing equipment, or any combination thereof.

In some implementations, the search system may communicate with database server 124 of FIG. 1 to compare selected objects to objects for which the search system has previously extracted topics. In an example, the search system stores topics extracted from a commonly used block of text (e.g., the U.S. Constitution) on database server 124. When the search system receives a selection of the same or similar text, it retrieves the previously extracted topics from database server 124 in place of or in addition to extracting new topics using the remote servers 114, 116, 118, or 120. In some implementations, the search system identifies and retrieves topics related to the same or similar non-text objects (e.g., an image) on database server 124. It will be understood that the examples above are merely illustrative and that the search system may retrieve previously extracted topics stored on database server 124 for any text object, non-text object, related object, or contextual information.

In step 320, the search system assigns weights to search topics. In some implementations, assigning weights to search topics includes assigning weights to the first set of search topics identified from the text objects in step 310, the second set of search topics as identified from non-text objects in step 312, the third set of search topics as identified from remaining content in step 314, the fourth set of search topics as identified from contextual data in step 316, other suitable sources of topics, or any combination thereof.

In some implementations, the search system assigns weights for a given topic based at least in part on where in the content or contextual data the topic was extracted. In some implementations, the search system assigns weights based in part on the object type from which the topic was extracted. In some implementations, the search system assigns weights that are different for different identified topics to improve the quality of the generated one or more search criteria. In an example, topics identified from objects within the selected content receive a relatively higher weight than topics identified from remaining content. This allows substantially all of the content to be included in a search, while the topics from the selected content are given priority in generating one or more search criteria. In some implementations, the weights assigned to contextual data are determined based on preferences of the user. In an example, a user may indicate an interest in sports, and the system may assign higher weights to the sports related content of a general news webpage than the non-sports related content. In some implementations, the weights assigned to contextual information are determined dynamically. In an example, search trends of other users are included at a relatively higher weight if a statistically significant related search topic is identified, while search trends of other users are included at a relatively lower weight if no statistically significant related search topics are identified. In a further example, a search for a currently-working movie actor identifies a spike in related recent search trends relating to the actor's most recent movie, whereas for a retired actor without a recent movie, no particular movie title may show a spike.

It will be understood that the multiple sets of search topics need not be used or otherwise generated by the content-based search application. Search topics may be defined by any one of the sets described (or by any other suitable data or technique).

In step 322, the search system may generate one or more search criteria using the topics and weights. In some implementations, a search criterion includes a string or strings of words used to query a database or index. In some implementations, the search system generates a plurality of search criteria and returns the criteria to the user for selection and/or refinement. In some implementations, the search system automatically executes the search without returning the one or more criteria for refinement to the user.

In some implementations, the search system uses the topics as a search criterion. In an example, if the topics are a string of five words, the search system may send that string of words to a search engine, for example, search engine 122 of FIG. 1. The search system may apply linguistic algorithm, heuristic algorithm, morphological algorithm, any other suitable algorithm, or any combination thereof, in generating one or more search criteria from the topics. As used herein, morphological algorithms are understood to relate to the smallest meaningful unit in a language, for example, root words, stems, prefixes, suffixes, and affixes. In some implementations the topics may be reconfigured, rearranged, added to, removed from, otherwise suitable altered, or any combination thereof. In some implementations, the search system applies query expansion to the topics, including adding synonyms, homonyms, spelling corrections, words sharing the same stem, other suitable ways to alter a search criterion, or any combination thereof. The search system adding a word with the same stem may include, for example, identifying the word "fishing" in the content and adding terms "fish," "fishes," "fishy," and "fisherman." The search system may add words in query expansion, for example, identifying the term "peanut" and adding "peanut butter," "peanut butter and jelly." In some implementations, the search system may remove or alter certain words based on their part of speech, such as, for example, articles "a" and "the," or conjunctions "and" and "so" from search topics. The search system may add similar terms, for example, adding "flower shop" to the topic "floral" and adding "pictures" to "photographs." In some implementations, the weights assigned to topics may be adjusted, for example, giving a relatively lower weight to a term instead of removing it completely from the one or more search criteria, giving a relatively higher weight to less common search terms, other suitable weighting schemes, or any combination thereof. The search system may include alternate spellings of words, such as equivalents between British English and American English. It will be understood that the search system may carry out some of the preceding steps to improve search results in extracting topics from the content, in generating one or more search criteria, in any other suitable step of processing, or any combination thereof. Processing steps to generate one or more search criteria may be carried out by user device 102 of FIG. 1, servers 114, 116, 118, or 120 of FIG. 1, search engine 122 of FIG. 1, database server 124 of FIG. 1, other suitable processing equipment, or any combination thereof.

In step 324, one or more search criteria are used to obtain search results. In some implementations, the system obtains search results using a search engine. In some implementations, the search results may relate to information on the Internet, an index of information local to the user device, on a private local network, on a collection of information remote to the user device, on any other suitable searchable data set, or any combination thereof.

In step 326, the search system returns results of obtained search results to the user using, for example, the display of the user device. In some implementations, the search system displays the results of a search in an Internet browser application. In some implementations, the search system displays the top result from the search without showing a list of results of the search. In some implementations, the search system displays results in an application separate from the Internet browser application.

It will be understood that the steps of the flow diagram are merely exemplary and that in some implementations, steps may be added, omitted, duplicated, reordered, or otherwise modified. In an example, a step may be added to activate a search mode, as described above. In a further example, step 316 where contextual search topics are added maybe omitted based on user preference.

Figure 4:
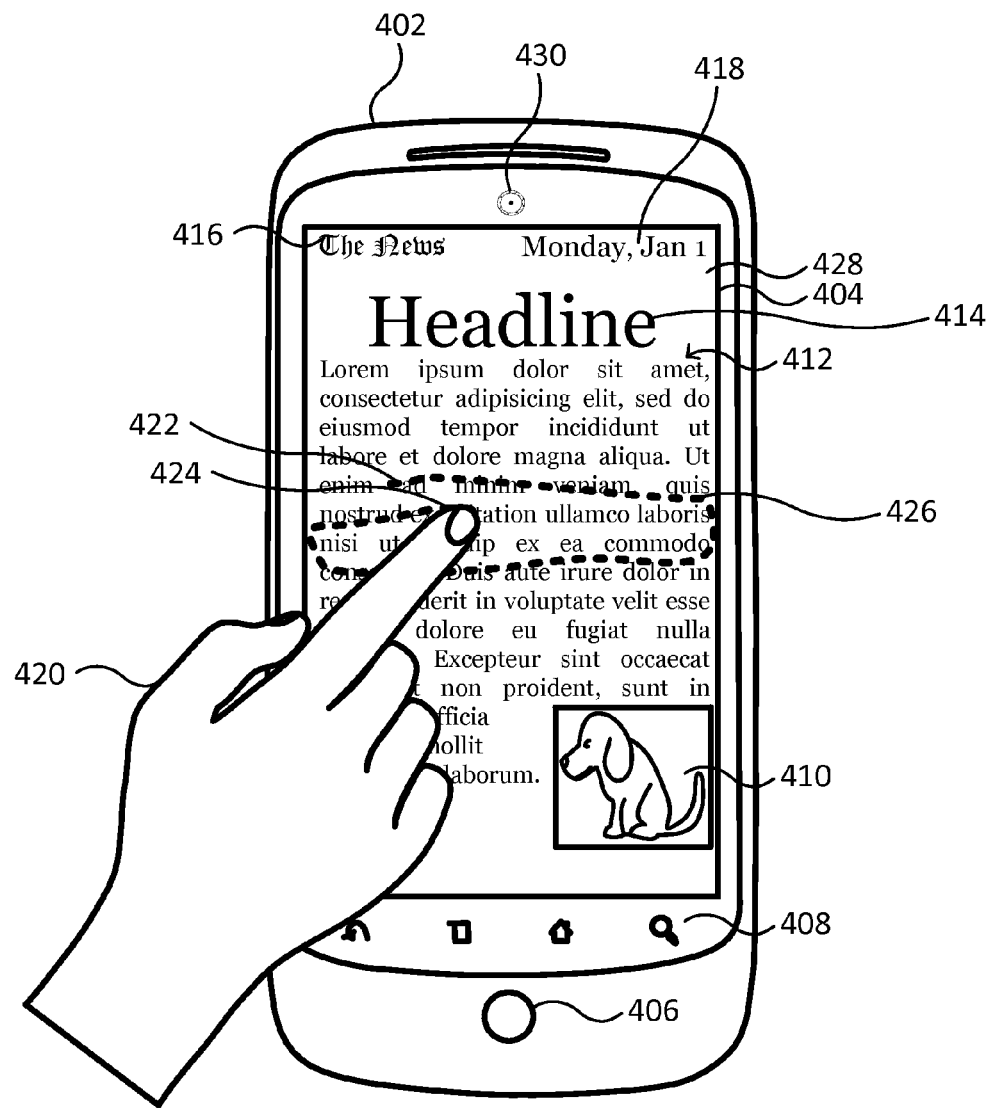
FIG. 4 is an illustrative example of a user interface for performing a gesture-triggered search in which a section of text is selected in accordance with some implementations of the present disclosure.

FIG. 4 is an illustrative example of a user interface for performing a gesture-triggered search in which a section of text is selected in accordance with some implementations of the present disclosure. In some implementations, the search system is implemented on a smartphone 402, including touchscreen 428 and display 404. The smartphone may include an electromechanical button 406, soft keys 408, and camera 430. Smartphone 402 may include equipment configured for communication with a network capable of providing content. Smartphone 402 may display the content on display 404. In an example, as illustrated in FIG. 4, smartphone 402 may display content that is the webpage of a newspaper. The content may include a body of text 412, headline of a news article 414, name of the newspaper 416, date of the news 418, image 410, and other content not shown.

In some implementations, the search system may activate the search mode after receiving a signal from the activation of one or more soft keys 408 or button 406. This may reconfigure certain functionalities of the user device to receive a gesture input. Touchscreen 428 may detect a gesture from user 420 in the form of gesture 426 traced on touchscreen 428, beginning near startpoint 422, following the dotted line path, and ending near endpoint 424. Touchscreen 428 may detect the gesture from the fingertip of user 428, from a stylus, from any other suitable pointing device, or any combination thereof. In some implementations, smartphone 402 may display gesture 426 on display 404 as a display element as it is received by touchscreen 428. The search system may interpret this gesture to indicate that the user desires further information about content within the loop.

Camera 428 may include, for example, camera 238 of FIG. 2. Camera 428 may be located on the same side of user device 402 as the display screen (as shown), on the opposite side, in any other suitable location, or any combination thereof. In some implementations, the search system may receive gesture information using camera 430. For example, camera 430 may detect a motion made by the fingers or hand of user 420, the eye motions of user 420, any other suitable gesture, or any combination thereof. The character-based search application may use the gesture information to identify a selection of content displayed on display 404.

In the implementation illustrated in FIG. 4, the objects within gesture 426 are text. The search system may identify the geometric center of the loop with respect to the content displayed on the display screen to determine the position of the words to be included in the selected content. The amount of area enclosed by the loop may be used to determine which words are included in the selected content.

The search system may use selected content, remaining content, related search terms, and contextual data, as described earlier in flow diagram FIG. 3, to generate one or more search criteria, and execute a search.

Figure 5:
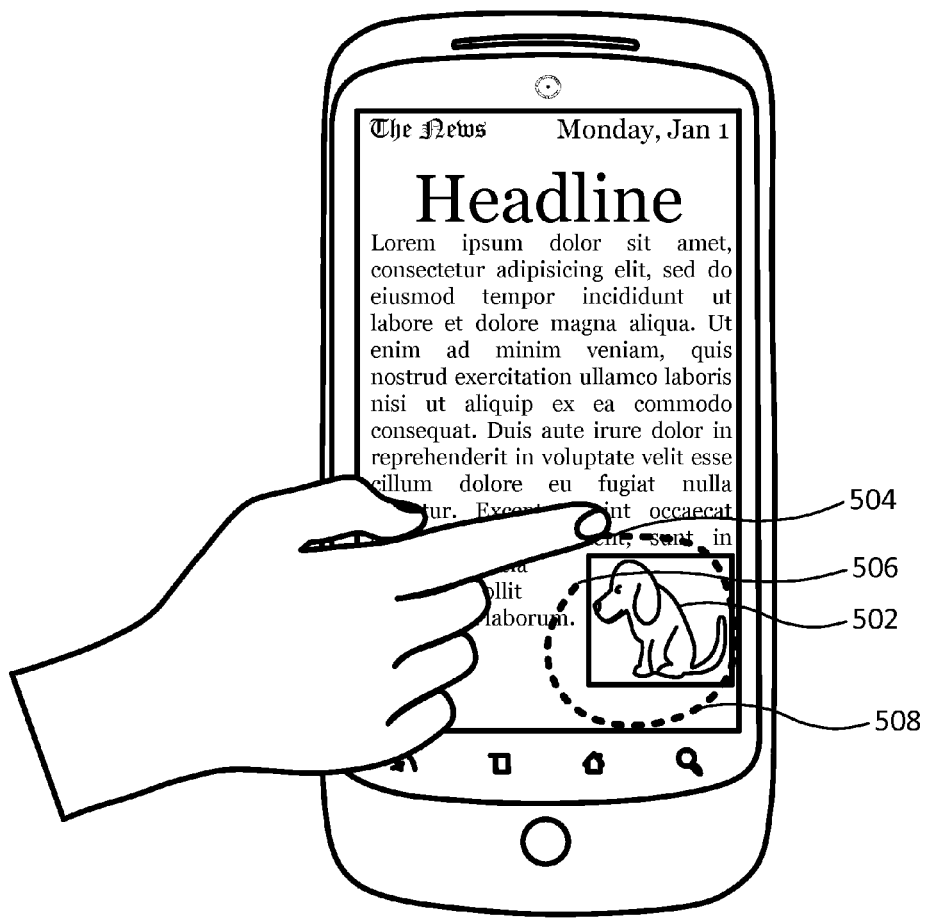
FIG. 5 is an illustrative example of a user interface for performing a gesture-triggered search in which an image is selected in accordance with some implementations of the present disclosure.

FIG. 5 is an illustrative example of a user interface for performing a gesture-triggered search in which an image is selected in accordance with some implementations of the present disclosure. A smartphone may obtain content and enter a search mode, as described above. The smartphone may receive gesture information identifying content about which a user desires more information. In the implementation illustrated by FIG. 5, the content is image 502. The smartphone may receive gesture 508 starting near startpoint 506, following the dotted line path, and ending near endpoint 504. The search system may display gesture 508 as it is received, as described above. In the implementation illustrated in FIG. 5, gesture 508 substantially encircles image 502. The search system may identify image 502 as an image object and extract metadata and visual information. The search system may identify topics from the metadata and visual information, as well as topics from the remaining content and contextual information, assign weights, generate one or more search criteria, and execute a search, as described above. For example, if image 502 is of a particular breed of dog, the search system may extract information from image 502 to generate one or more search criteria relating generally to dogs, and specifically dogs of that particular breed.

Figure 6:
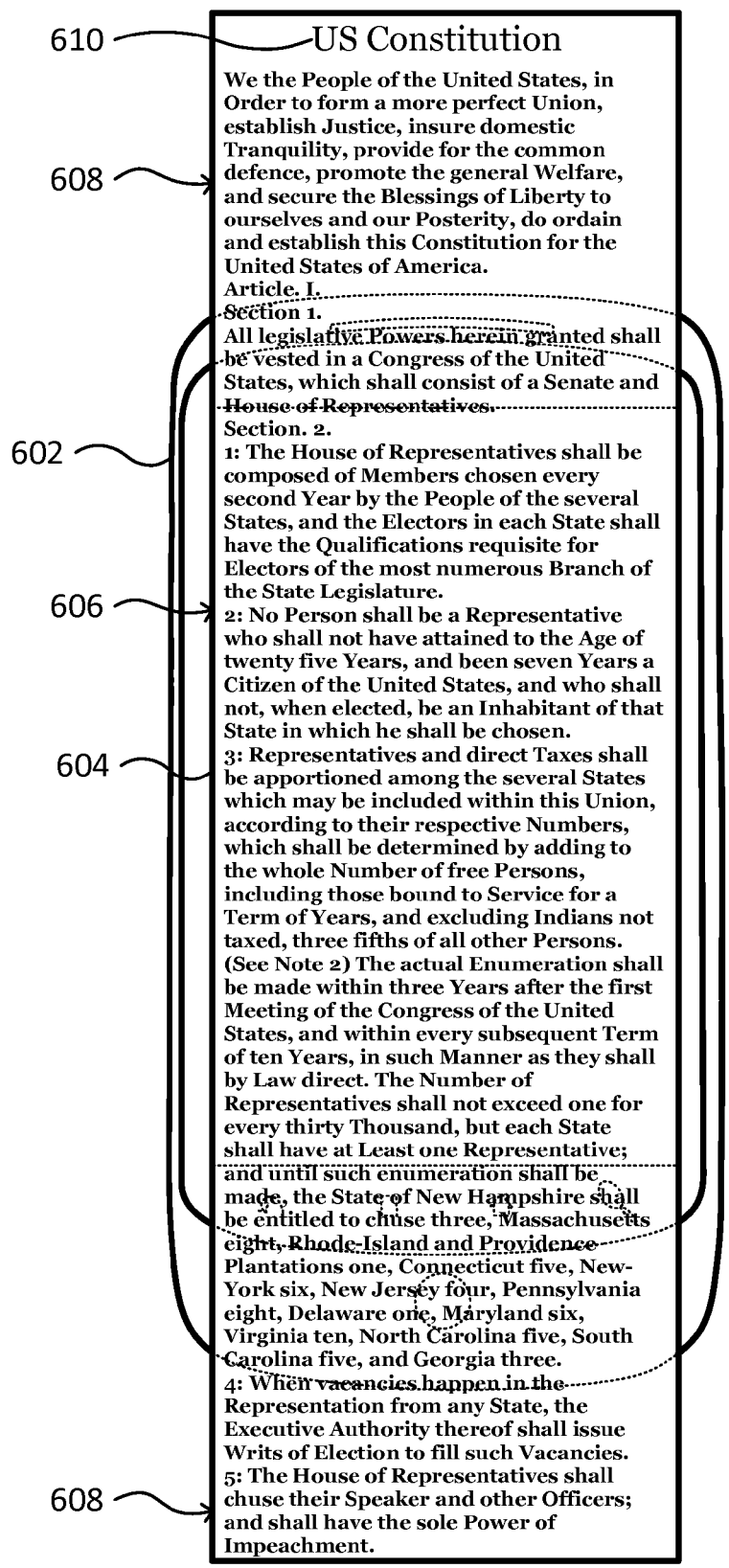
FIG. 6 illustrates content displayed by a user device and surrounding non-displayed content in accordance with some implementations of the present disclosure.

FIG. 6 illustrates content displayed by a user device and surrounding non-displayed content in accordance with some implementations of the present disclosure. User device 602 may contain display 604. In the example illustrated in FIG. 6, the display screen is displaying content that is the preamble and first two sections of Article 1 of the U.S. Constitution. As drawn, the displayed portion of the content 606 includes Article I, Section 2, Clause 1; Article I, Section 2, Clause 2; and a portion of Article I, Section 2, Clause 3. The non-displayed portion of the content 608 includes title 610, Preamble; Article I, Section 1; a portion of Article I, Section 2, Clause 3; Article I, Section 2, Clause 4; and Article I, Section 2, Clause 5. It will be understood that the non-displayed portion of the content 608 will not be visible and is illustrated in FIG. 6 bound by a dashed line for explanatory purposes. In some implementations, the portion of content displayed may be reconfigured by, for example, scrolling or zooming.

In some implementations, the search system may receive a shake or other gesture (described below). The search system may extract topics from the displayed content 606 to form a first subset. The search system may extract topics from the non-displayed portion of the content 608 to form a second subset. The content based-search application may include related topics and contextual information as a third subset. The search system may assign weights to the topics. For example, the search system may assign a relatively higher weight to the first subset containing topics extracted from displayed content 606, and assign a relatively lower weight to the second subset containing topics extracted from the non-displayed content 608. In some implementations, this allows for substantially all of the content in both displayed content 606 and non-displayed content 608 to be included in generating one or more search criteria, while giving priority to displayed content 606.

Figure 7:
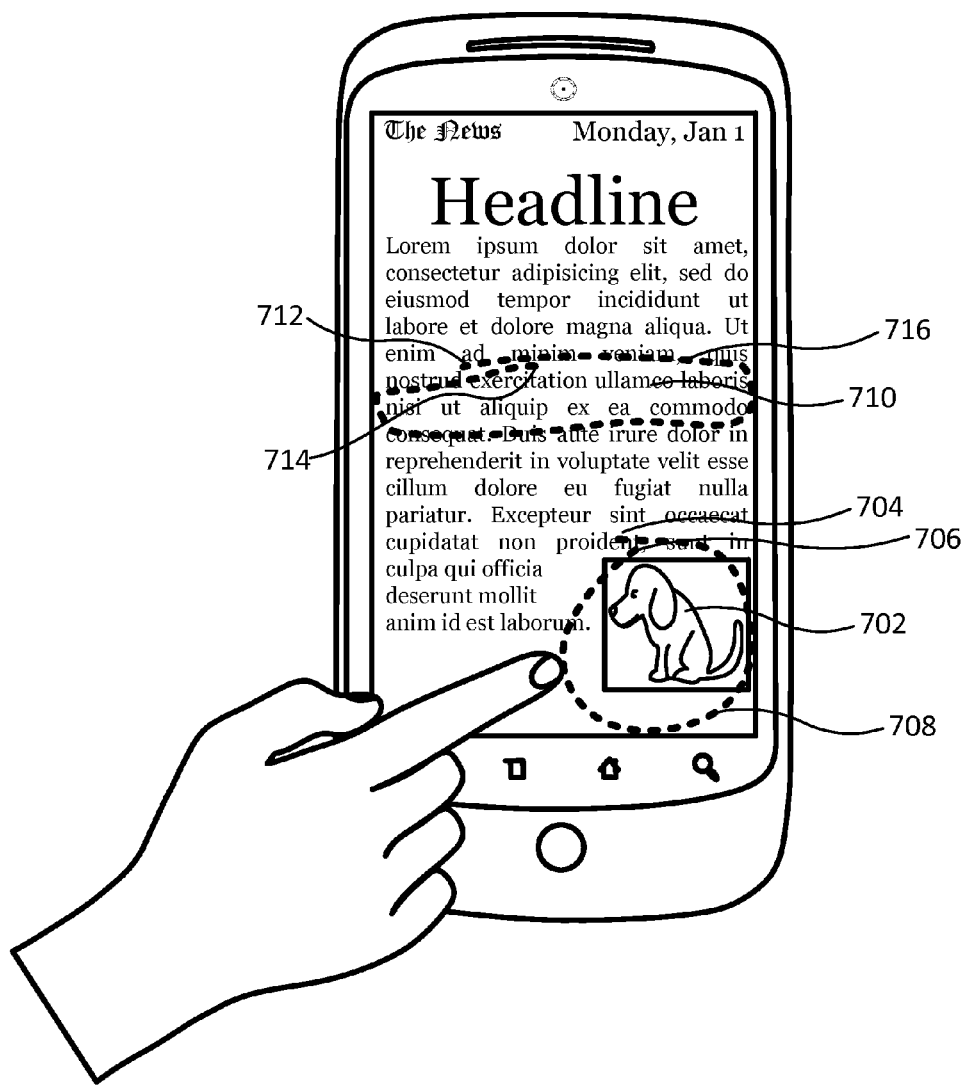
FIG. 7 is an illustrative example of a user interface for performing a gesture-triggered search in which multiple objects are distinctly selected in accordance with some implementations of the present disclosure.

FIG. 7 is an illustrative example of a user interface for performing a gesture-triggered search in which multiple objects are distinctly selected in accordance with some implementations of the present disclosure. A user device such as a smartphone may obtain content and enter a search mode, as described above. The search system may receive information from the user relating to content about which more information is desired. In the implementation illustrated in FIG. 7, the content includes two or more non-adjacent objects of the same or different type (e.g., image and text).

The search system may receive two or more gestures traced on the touchscreen. A first gesture 708 substantially enclosing image 702 may be received starting near startpoint 704, ending near endpoint 706, and following the dotted line path. A second gesture 716 substantially enclosing text 710 may be received starting near startpoint 712, ending near endpoint 714, and following the dotted line path. The search system may identify object 702 enclosed by loop 708 as an image object and extract metadata and visual information. The search system may identify a first set of topics from the metadata and visual information extracted from image object 702. The search system may identify object 710 enclosed by the loop 716 as text and extract a second set of topics from the text. The search system may identify a third set of topics from the remaining content, from contextual information, and from related content. The search system may assign weights to the topics. The search system may use the weights and topics to generate one or more search criteria and execute a search, as described above. For example, the search system may assign a relatively higher weight to the topics extracted from the selected content and assign a relatively lower weight to the topics extracted from the remaining content and contextual information. In this way, the search system may include substantially all of the content in generating one or more search criteria, while priority is given to the selected content.

In some implementations, a touchscreen capable of receiving multiple simultaneous inputs may receive loops 708 and 716 substantially concurrently, for example, using two fingers to draw two loops on the touchscreen at the same time. In some other implementations, a touchscreen may receive the two gestures successively while in the search mode. For example, the search system may receive a first input to a soft key indicating a desire to enter the search mode, receive a first loop drawn on the touchscreen, receive a second loop drawn on the touchscreen, and receive a second input to a soft key indicating a desire to exit the search mode. Exiting the search mode may trigger the search system to extract topics and generate one or more search criteria based on both the first and second loops. It will be understood that the use of two concurrent or successive gestures to indicate content is merely illustrative. The search system may receive any number of gestures in any suitable technique to select content in accordance with the present disclosure.

Figure 8:
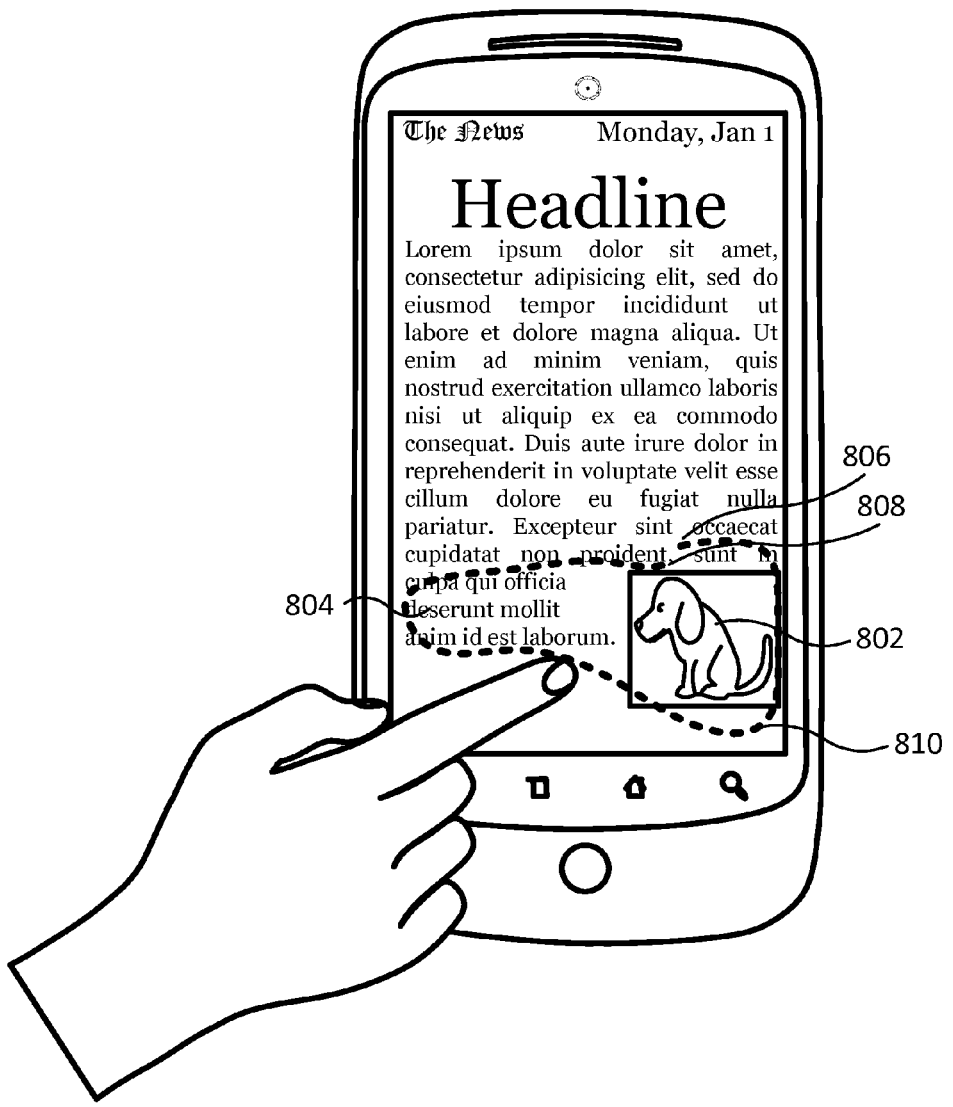
FIG. 8 is an illustrative example of a user interface for performing a gesture-triggered search in which multiple objects are collectively selected in accordance with some implementations of the present disclosure.

FIG. 8 is an illustrative example of a user interface for performing a gesture-triggered search in which multiple objects are collectively selected in accordance with some implementations of the present disclosure. The search system may obtain content and enter a search mode, as described above. The search system may receive information from the user relating to content about which more information is desired. In the implementation illustrated in FIG. 8, the content includes two or more adjacent objects of the same or different type (e.g., image and text). The search system may receive gesture 810 starting near startpoint 806, ending near endpoint 808, and following the dotted line path. The loop may substantially enclose image 802 and text 804. The search system may identify image 802 enclosed by loop 810 as an image object and extract metadata and visual information. The search system may identify topics from the metadata and visual information extracted from image 802. The search system may identify text 804 enclosed within loop 810 as text and extract topics from the text. The search system may identify topics from the remaining content and contextual information. The search system may assign weights to the topics and execute a search, as described above. It will be understood that the content within loop 810 may be any combination and number of object types, for example, text and video; image and audio; text, image, and video.

Figure 9:
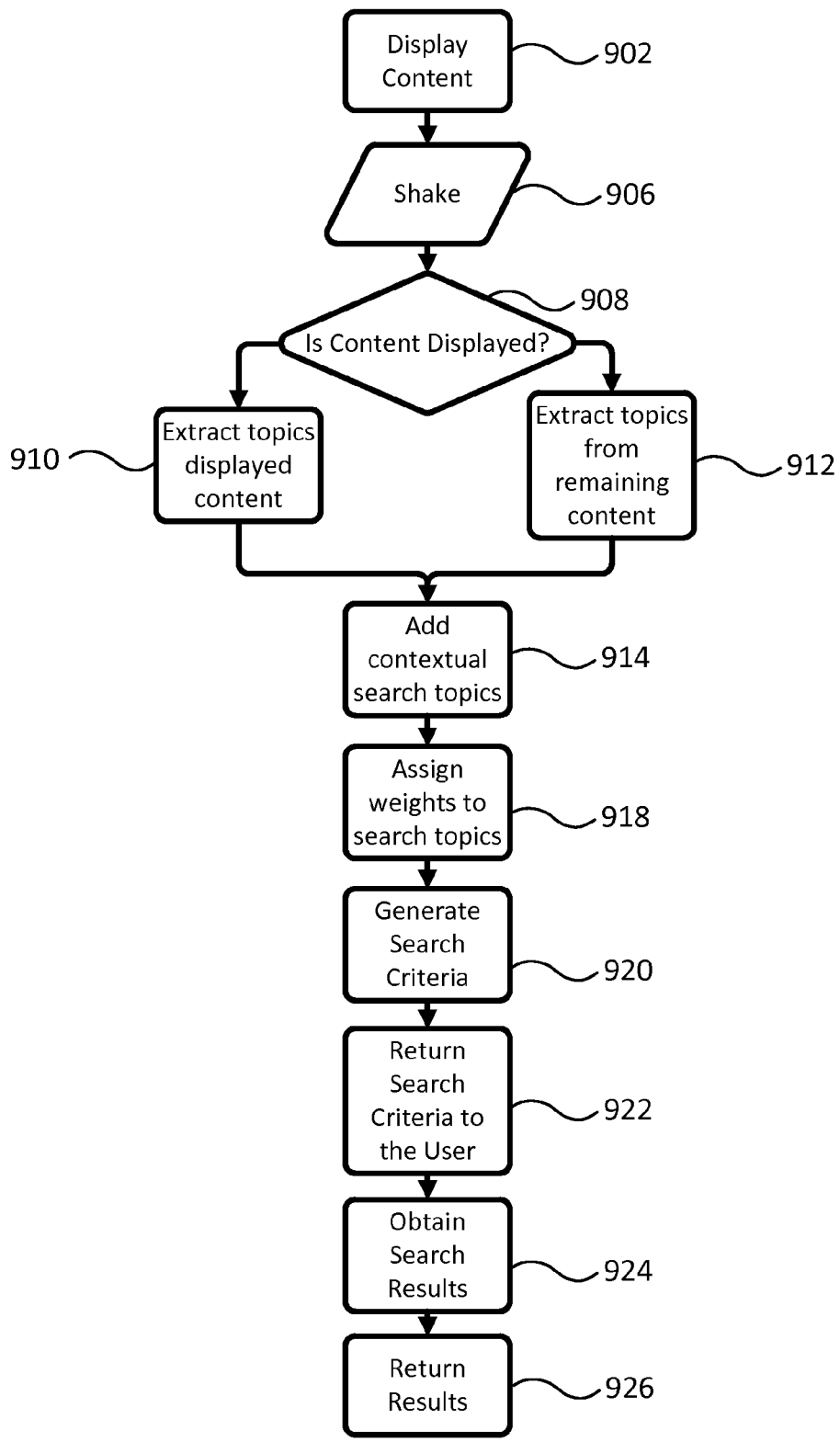
FIG. 9 is flow diagram showing illustrative steps for implementing a shake-triggered search of displayed content on a user device in accordance with some implementations of the present disclosure.

FIG. 9 is flow diagram showing illustrative steps for implementing a shake-triggered search of displayed content on a user device in accordance with some implementations of the present disclosure. In some implementations of this disclosure, the search system receives a trigger to execute a search from a sensor, for example, accelerometer 212 of FIG. 2, button 210 of FIG. 2, touchscreen 208 of FIG. 2, any other suitable input, or any combination thereof. It will be understood that the search system may execute functions other than a search in response to receiving the gesture, such as opening a program, closing a program, executing a command, opening a document, closing a document, sending a communication, any other suitable function, or any combination thereof.

In step 902, the search system displays content to a user. In some implementations, the search system receives input relating to content for which the user may desire more information. In some implementations, the content displayed includes, for example, a webpage in an Internet browser application, an email, a document, other suitable content, or any combination thereof.

In step 906, the search system receives a shake input. In some implementations, the shake input is received by an accelerometer such as accelerometer 212 of FIG. 2. As used herein, the shake is understood to be a shake, flip, inversion, rotation, or other suitable predefined motion of the user device, or any combination thereof, such that it is received and recognized by the content-based search application. Alternatively, in place of or in addition to a shake, the search system receives another input to trigger a search such as activation of a button, selection of a menu item, indication of an area of a touchscreen, other suitable input, or any combination thereof.

In decision step 908, the search system identifies if content is displayed on the display screen at the time of the shake input. In step 910, the search system extracts content from the displayed content as a first subset of topics. In step 912, the search system extracts topics from the remaining non-displayed content as a second subset of topics. In an example, a web browser application only displays a portion of the content of a long webpage on the screen at the time of the shake input, and another portion of the webpage content remains beyond the visible portion of the content. In some implementations, the topics extracted from the portion displayed comprises the first subset of topics and the topics extracted from the portion beyond the visible portion comprises the second subset of topics.

In step 914, the search system adds contextual and related search topics to the topics extracted from the text and non-text objects. In some implementations, contextual data includes, for example, the time, date, geographic location, history, and trends of other users may be identified as a fourth set of topics by the search system used to generate one or more search criteria. In some implementations, the search system determines the time and date from an internal clock, remote time server, other suitable source of time and date information, or any combination thereof. In some implementations, the search system determines the geographic location using a global positioning system (GPS) receiver, such as, for example, GPS receiver 236 of FIG. 2. In some implementations, the search system determines the geographic location using cellular tower proximity, user input, other suitable source of location information, or any combination thereof. The history may include the search history of the user, the browser history of the user, information from social media sites, trends of other users, other suitable historical information or any combination thereof. Trends of other users may include recent spikes in search trends of other users in response to current events or interest, the history of a user's friends on social networks, the history of other users near to the user at the time, as determined by geographic location, other suitable trend information, or any combination thereof. Contextual information may be provided by remote servers, the content-based search application, direct peer-to-peer communication, user input, other suitable sources, or any combination thereof.

In some implementations, the content based search application processes selected objects and extracts topics from content, related content, and contextual information using remote servers such as servers 114, 116, 118, and 120 of FIG. 1, and database server 124 of FIG. 1. In some implementations, the remote server may divide text objects into segments such as phrases, and may identify the parts of speech of individual words. The search system may use statistical analysis, heuristic algorithms, artificial intelligence, natural language processing, machine learning, other suitable processing techniques, or any combination thereof, to extract topics from text or from textual content associated with non-text objects (e.g., metadata terms or anchor text). Processing steps for the above listed techniques may be carried out by user device 102 of FIG. 1, servers 114, 116, 118, or 120 of FIG. 1, search engine 122 of FIG. 1, database server 124 of FIG. 1, other suitable processing equipment, or any combination thereof.

In some implementations, the search system communicates with database server 124 of FIG. 1 to compare selected objects to objects for which the search system has previously extracted topics. For example, the search system may store topics extracted from a commonly used block of text (e.g., the U.S. Constitution) on database server 124. When the search system receives a selection of the same or similar text, it may retrieve the previously extracted topics from database server 124 in place of or in addition to extracting new topics using the remote servers 114, 116, 118, or 120. In some implementations, the search system identifies and retrieves topics related to the same or similar non-text objects (e.g., an image) on database server 124. It will be understood that the examples above are merely illustrative and that the search system may retrieve previously extracted topics stored on database server 124 for any text object, non-text object, related object, or contextual information.

In step 918, the search system assigns weights to the search topics, as described above. In an example, the search system assigns a relatively higher weight to the first set of subset of topics extracted from the displayed content and the search system assigns a relatively lower weight to the second subset of topics extracted from the remaining content, such that substantially all of the content is used to generate one or more search criteria while giving priority to those topics displayed at the time of the shake input.

In step 920, the search system generates one or more search criteria. In some implementations, the search system uses the search topics and the weights to generate the one or more search criteria. In some implementations, the search system generates one or more search criteria, for example, as described in step 322 of FIG. 3.

In step 922, the search system returns one or more search criteria to the user. In some implementations, the one or more search criteria are returned for further refinement. In some implementations, the search system automatically obtains search results based on the one or more search criteria without returning the one or more criteria for refinement to the user.

In step 924, one or more search criteria are used to obtain search results. In some implementations, the search system obtains search results using the one or more search criteria. In some implementations, the search system searches for information on the Internet using, for example, a search engine. In some implementations, the search system executes the search on an index of information local to the user device, on a private local network, on a collection of information remote to the user device, on any other suitable searchable data set, or any combination thereof.

In step 926, the search system returns results of the obtained search results. In some implementations, the search system displays results of a search in an Internet browser. In some implementations, the search system displays the top result from the search without showing the list of results of the search. In some implementations, the search system shows the results in an application separate from the Internet browser application.

It will be understood that the steps of the flow diagram are merely exemplary and that in some implementations, steps may be added, omitted, duplicated, reordered, or otherwise modified.

Figure 10:
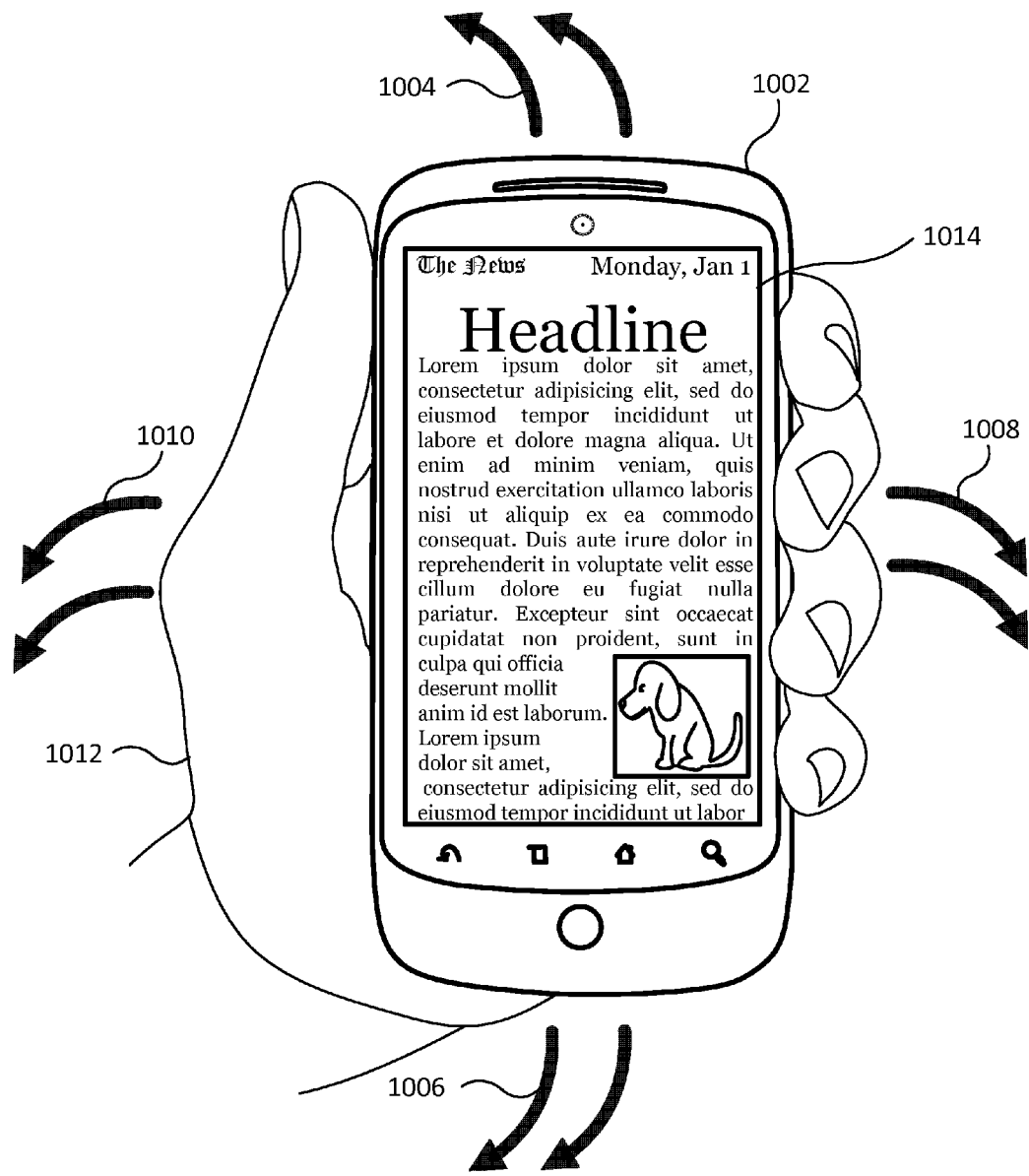
FIG. 10 illustrates a shake gesture in accordance with some implementations of the present disclosure.

FIG. 10 illustrates a shake gesture in accordance with some implementations of the present disclosure. User device 1002 may be a handheld device held by user 1012, displaying content 1014. In some implementations, user device 1002 may receive a side-to-side shake input by receiving alternating motion in the direction of arrows 1008 and arrows 1010. In some implementations, user device 1002 may receive an up-and-down shake input by receiving alternating motion in the direction of arrows 1004 and arrows 1006. An accelerometer may receive input based on motion indicate by the direction of arrows 1004, 1006, 1008, and 1010. User device 1002 may receive input other than those described by the arrows, for example, the inputs described for step 906 of FIG. 9.

In some implementations, the user device may provide content such as a news article displayed within the smartphone application of a newspaper. The content may include a listing of local events, and the portion of the content visible on the screen may, for example, include a particular event about which the user desires more information. A shake input may be received by the content-based search application. The search system may assign a relatively higher weight to topics extracted from the displayed information about the particular event, while assigning a relatively lower weight to the remaining content, related topics, and contextual information. For example the generated one or more search criteria may relate to content including the specific event information, date information, time information, location information, other information contained in the displayed content, other information contained in the remaining content, other contextual information, other suitable information, or any combination thereof.

Figure 11:
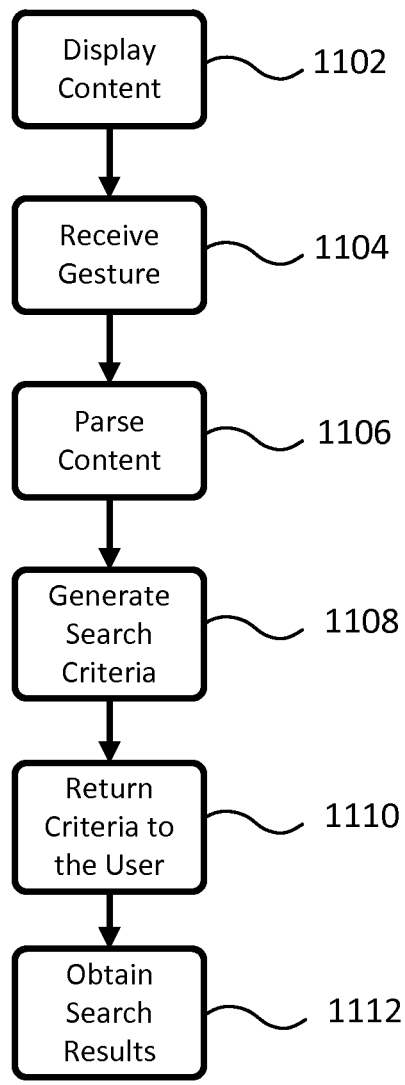
FIG. 11 is a flow diagram showing illustrative steps for implementing a content-based search triggered by a gesture in accordance with some implementations of the present disclosure.

FIG. 11 is a flow diagram showing illustrative steps for implementing a content-based search triggered by a gesture in accordance with some implementations of the present disclosure. This diagram is intended to show some of the steps embodied by this disclosure.

In step 1102, the search system displays content. In some implementations, the search system may display content on the display screen of a user device. In some implementations, the user device is user device 102 of FIG. 1. In step 1104, the search system receives a gesture. In some implementations, the gesture is received by an accelerometer, a button, a touchpad, a microphone, an optical sensor, any other suitable sensor capable of receiving input, or any combination thereof. In step 1106, the search system parses content displayed on the display screen. In some implementations, parsing of the content includes extracting topics from text and non-text objects, identifying related search topics, identifying contextual information, and assigning weights to the topics. In some implementations, the search system assigns weights based on the position of the content in the display screen with respect to a gesture, position of the content with respect to the visible portion of the content on a display screen, search history, user-defined preferences, search trends of other users, the presence of spikes in other user's search trends, news events, other suitable information for assigning weights, or any combination thereof. In some implementations, the search system assigns weights as described for step 320 of FIG. 3 and/or step 918 of FIG. 9. In step 1108, the search system generates one or more search criteria based in part on the topics and their assigned weights. In step 1110, the search system returns the one or more search criteria to the user for refinement. In an example, a plurality of search criteria are returned, where some include related topics from recent news events and some do not include related topics, such that the search system receives information from the user as to the user's desired preference. In step 1112, the search system obtains search results. In some implementations, the search system may obtain search results related to an index or database. In an example, the system obtains search results including information from the Internet using a search engine.

It will be understood that the steps of the flow diagram are merely exemplary and that in some implementations, steps may be added, omitted, duplicated, reordered, or otherwise modified.

Figure 12:
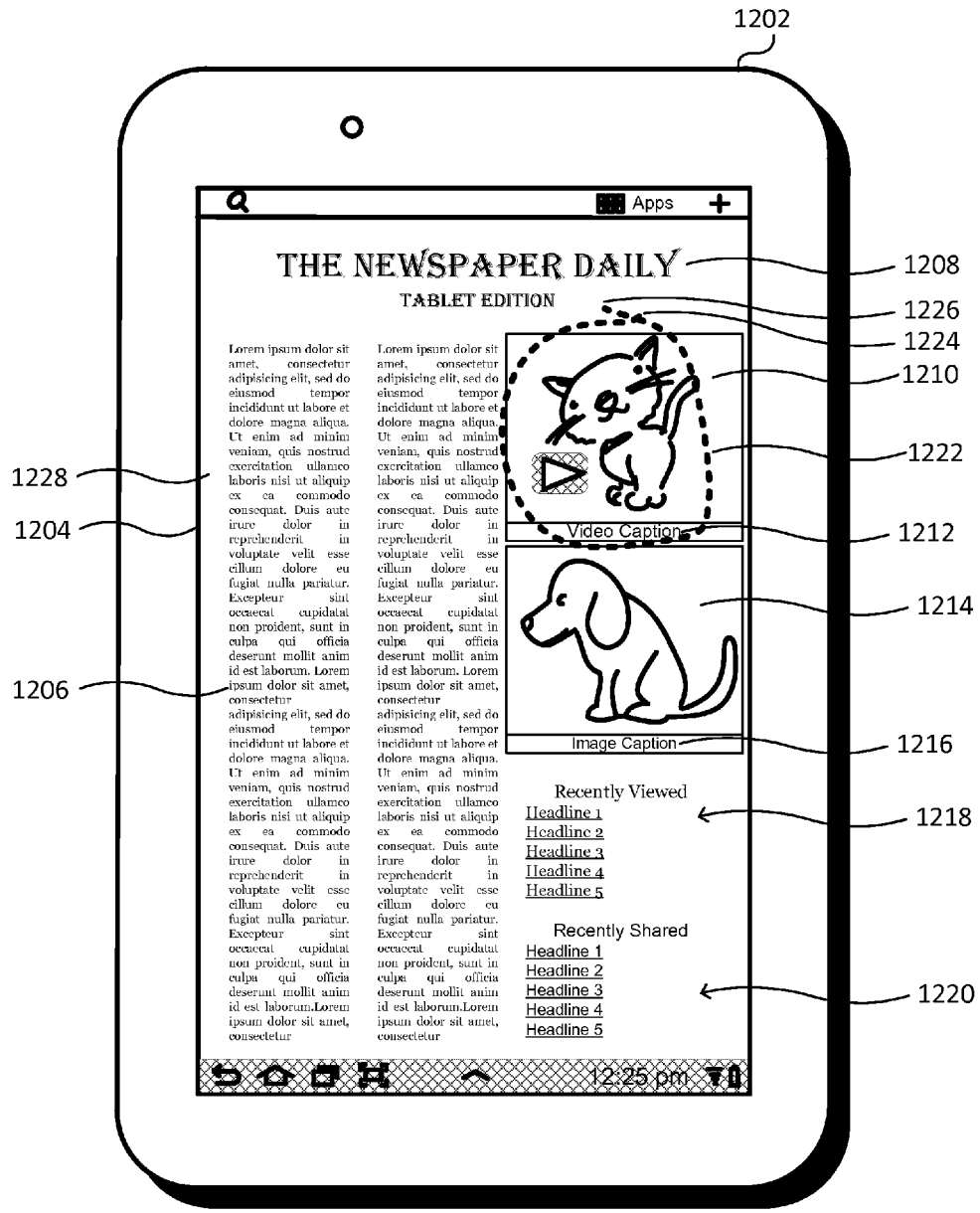
FIG. 12 is an illustrative tablet device on which a gesture-triggered, content-based search may be implemented in accordance with some implementations of the present disclosure.

FIG. 12 is an illustrative tablet device on which a gesture-triggered, content-based search may be implemented in accordance with some implementations of the present disclosure. As used herein, a table device is understood to be computing equipment with a substantially flat form comprising a touchscreen approximately, but not limited to, 6 to 10 inches when measured along the diagonal. In some implementations, tablet user device 1202 may be used to receive and display content. The tablet may include a touchscreen 1228 and display 1204. In the implementation illustrated in FIG. 12, the displayed content may include text 1206, image 1214 with image caption 1216, video 1210 with video caption 1212, and headline 1208, a list of the recent most commonly viewed articles 1218, and a list of the recent most commonly shared articles 1220, and other content not shown.

In some implementations, the search system may receive input from the user indicating that the user desires more information about video 1210. Touchscreen 1228 may receive gesture 1222 traced from startpoint 1224 to endpoint 1226 along the dotted line path. Gesture 1222 may substantially encircle video 1210 and caption 1212. The search system may extract information in the form of metadata and other visual and audio information from the video. The search system may identify search topics from the extracted information and caption 1212. Topics may be extracted from the remaining content as described above. Remaining content may include the history provided by the content provider in list of recently viewed articles 1218 and recently shared articles 1220. The search system may add related search topics and contextual topics to the search topics as described above. The search system may assign weights to the search topics. The search system may use the search topics and weights to generate one or more search criteria and execute a search.

Figure 13:
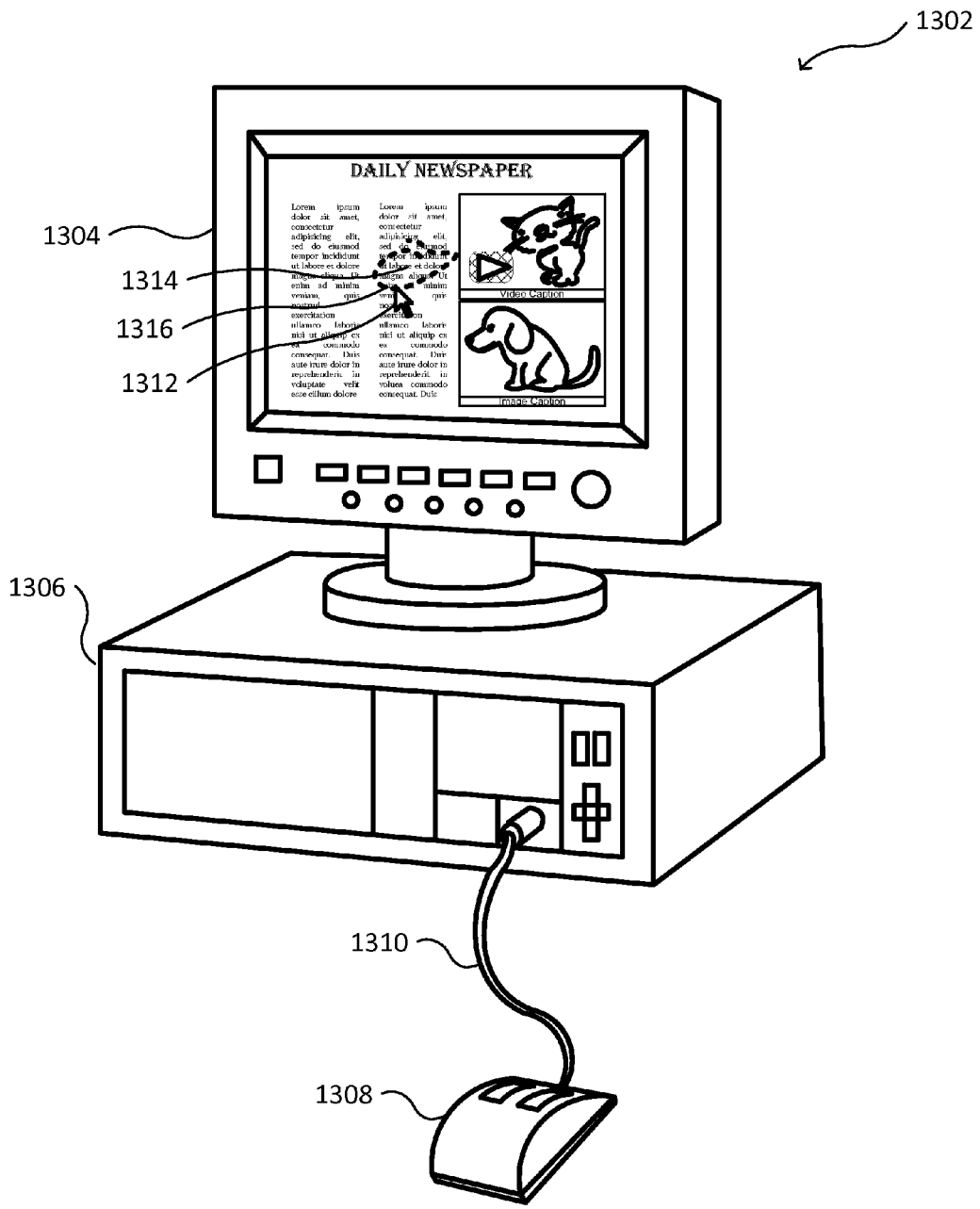
FIG. 13 is an illustrative desktop computer on which a gesture-triggered, content-based search may be implemented in accordance with some implementations of the present disclosure.

FIG. 13 is an illustrative desktop computer on which a gesture-triggered, content-based search may be implemented in accordance with some implementations of the present disclosure. Desktop computing system 1302 may include monitor 1304, computer 1306, and input device 1308.

Monitor 1304 may include a liquid crystal display (as shown), light emitting diode display, plasma display, cathode ray tube display, projector display, other suitable display, or any combination thereof. Computer 1306 may include processing equipment capable of receiving and display content, receiving inputs from a user, communicating with remote servers, other suitable computing functions, or any combination thereof.

Input device 1308 may include a mouse, trackball, keyboard, pointing stick, joystick, touchpad, other suitable input device capable of indicating a portion of the display, or any combination thereof. The input device 1308 may be coupled to computer 1306 by cable connection 1310, a wireless connection, by any other suitable connection, or any combination thereof. Input device 1308 may control cursor 1312 on monitor 1304.

In some implementations, at least some of the components of desktop computing system 1302 may be included in a laptop, netbook, any other suitable arrangement, or any combination thereof.

In some implementations, the content may be displayed on monitor 1304 of desktop computing system 1302. The search system may receive input from a user indicating content about which the user desires more information. The search system may receive information indicating text 1314 as selected content by receiving gesture 1316 using cursor 1312, as controlled by input device 1308. The search system may use text 1314 to identify search topics. The search system may identify the selected content in gesture 1316 as one or more of the object types described above (e.g., image, text, video, audio, dynamic content). The search system may identify search topics from the remaining content. The search system may identify related search topics from the content, and may identify contextual information. The search system may assign weights to the topics. The search system may use topics and weights to generate one or more search criteria. The search system may return one or more search criteria to the user for further refinement. The search system may execute a search using the one or more search criteria and return results to the user. In some implementations, the search system may receive information about selected content by receiving a highlight, click, tap, point, other suitable gesture or actions, or any combination thereof. Predefined keys on a keyboard (not shown) may trigger the content-based search application.

Figure 14:
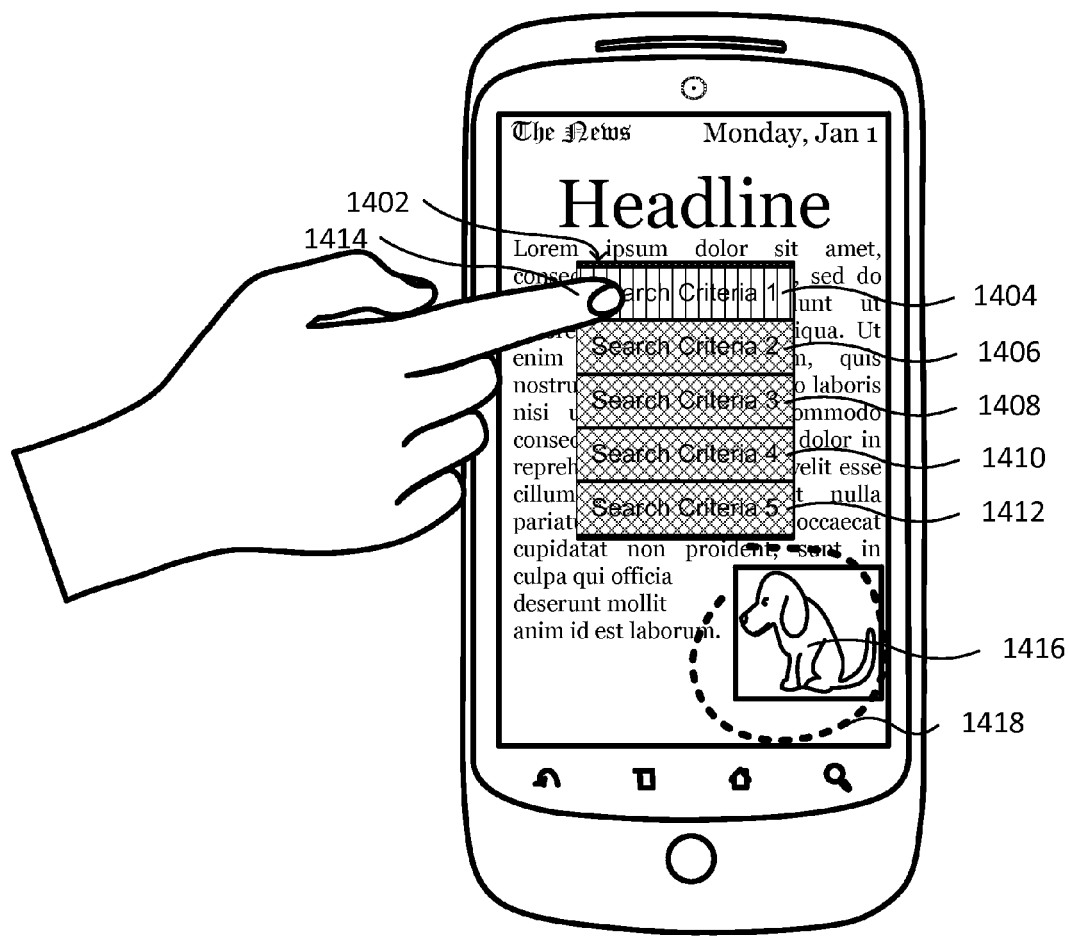
FIG. 14 is an illustrative interface for displaying one or more search criteria in accordance with some implementations of the present disclosure.

FIG. 14 is an illustrative interface for displaying one or more search criteria in accordance with some implementations of the present disclosure. In some implementations, the search system may return the one or more search criteria generated from content and other topics to the user before executing the search. Returning the one or more search criteria to the user may take place, for example, as a part of step 1110 of FIG. 11.

In some implementations, the search system may receive information relating to the selection of object 1416 by receiving gesture 1418. The search system may parse the content and generate, for example, 5 possible search criteria. Search box 1402 may display the five criteria: "Search Criterion 1" 1404, "Search Criterion 2" 1406, "Search Criterion 3" 1408, "Search Criterion 4" 1410, and "Search Criterion 5" 1412. The search system may receive an input from user 1414, indicating which search criterion is desired for executing the search. The desired search criterion may be selected by receiving input on a touchscreen, a button, a scroll wheel, an accelerometer, any other suitable device, or any combination thereof. In the implementation illustrated in FIG. 14, "Search Criterion 1" 1404 is selected. In some implementations, the search system may receive input from the user indicating a desired change or edit of the search criterion. For example, the search system may receive input from the user using a keyboard indicating that the user desires to add a word to "Search Criterion 1" 1404.

Figure 15:
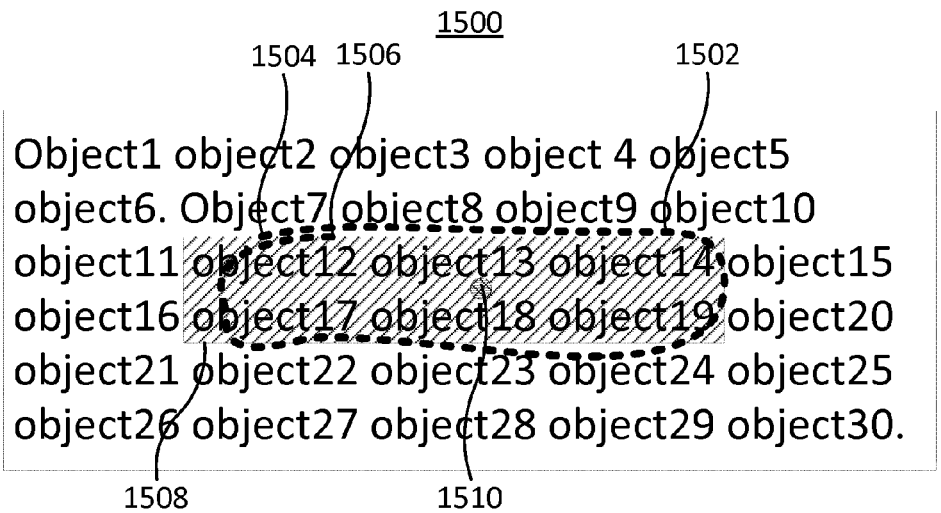
FIG. 15 illustrates a method of indicating objects with a gesture in accordance with some implementations of the present disclosure.

FIG. 15 illustrates indicating objects with a gesture in accordance with some implementations of the present disclosure. In some implementations, text or other objects may be indicated by enclosing them in a loop. For example, a search system may receive a loop gesture using a touchscreen. The gesture may substantially encircle a portion of text. The search system may display text 1500 on the display screen. The search system may receive gesture 1502 starting near startpoint 1504 and following the dotted line path to endpoint 1506. As illustrated, gesture 1502 substantially encircles the objects in area 1508 (i.e., object12, object13, object14, object17, object18, and object19). In some implementations, the search system may extract a set of search topics from the objects in area 1508.

Figure 16:
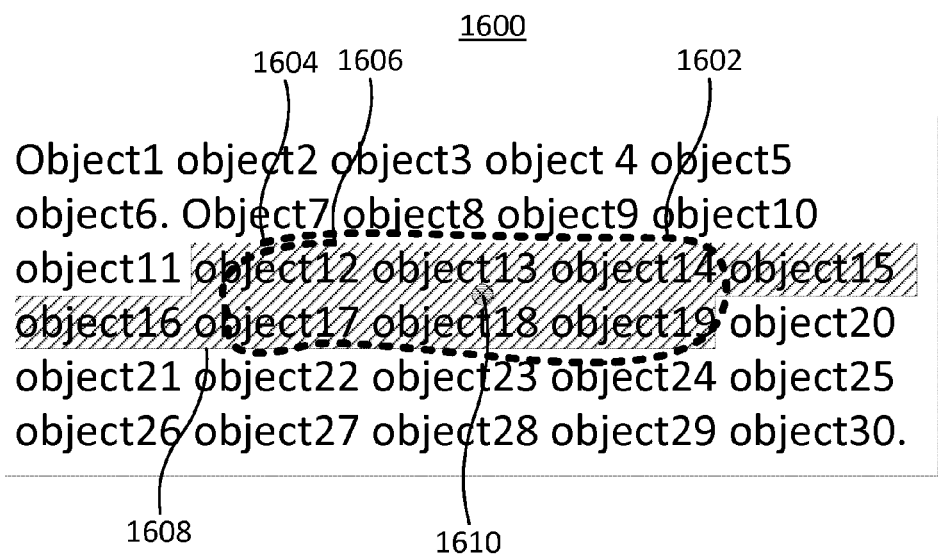
FIG. 16 illustrates another method of indicating objects with a gesture in accordance with some implementations of the present disclosure.

FIG. 16 illustrates another method of indicating objects with a gesture in accordance with some implementations of the present disclosure. In some implementations, text or other objects may be indicated by enclosing them in a loop. For example, a search system may receive a loop gesture using a touchscreen. The search system may display text 1600 on a display screen. The search system may receive gesture 1602 starting near startpoint 1604 and following the dotted line path to endpoint 1606. In some implementations, the search system may determine the geometric center of gesture 1602 as point 1610. The search system may determine the area enclosed by gesture 1602. The search system may use the area to determine which objects to include in generating search topics. The search system may include objects (e.g., words in paragraph form) consecutively, as indicated by region 1608 (i.e. object 12, object 13, object 14, object 5, object 16, object 17, object 18, object 19). In this example, the search system includes all of the objects encircled by loop gesture 1602, as well as objects that may be desirable due to the format of the content. For example, the search system may receive a gesture on a touchscreen indicating text content on a display but the gesture may not reach the edges of the touchscreen. In this arrangement, the search system may include content up to the edges of the display. In some implementations, the search system may include adjacent objects of, for example, a text block, that are not visible on the display screen due to screen size or zoom. if they are part of a substantially continuous text block. The search system may interpret gestures based in part on the type or types of objects contained within the content. It will be understood that the use of gestures including substantially closed loops, circles, or any other shape used for enclosing content is merely illustrative. The search system may receive any other suitable input for selecting content in accordance with the present disclosure. For example, the search system may allow a user to select content by tapping on a region of the display and causing content associated with that region to be selected (and highlighted or circled on the display).

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following numbered paragraphs. In some implementations, selected content may be parsed and used for applications other than search applications. For example, selected content may be parsed and used to create a social media posting, compose a message (e.g., email, SMS or chat), edit a document, direct a browser to a URL, launch an application, perform any other suitable function, or any combination thereof.

What is claimed:
1. A computer-implemented method comprising:
providing content for display on a display screen of a user device;
receiving gesture data from a user, wherein the gesture data is associated with a user selection of a portion of the displayed content;
identifying, in response to receiving the gesture data, a plurality of objects in the selected portion of the display content, wherein the plurality of objects includes a first object having a first object type and a second object having a second object type;

determining one or more search queries, wherein determining the one or more search queries includes:
  identifying one or more first topics from the first object and one or more second topics from the second object,
  determining a respective first weight for each of the first topics and a respective second weight for each of the second topics based on a plurality of criteria including the respective object types of the first object and the second object, and
  determining the one or more search queries based on the one or more first topics, the one or more second topics, the respective first weights, and the respective second weights; and
  providing, in response to the one or more search queries, one or more search results for display on the display screen of the user device.

2. The method of claim 1, further comprising obtaining the provided content from one or more sources remote from the user device.

3. The method of claim 1, further comprising activating a search mode of operation prior to receiving the gesture data.

4. The method of claim 1, wherein receiving the gesture data comprises receiving user input defining the user selection of the portion of the displayed content.

5. The method of claim 1, wherein receiving the gesture data comprises sensing a path using a touch sensitive sensor.

6. The method of claim 1, wherein identifying the plurality of objects in the selected portion of the displayed content comprises parsing the selected portion of the display content provided on the display screen, the selected portion of the displayed content including text, image, audio, video, and any combination thereof.

7. The method of claim 1, further comprising:
  generating, in response to receiving the gesture data from the user, one or more search criteria;
  providing the one or more search criteria on the display screen of the user device; receiving user selection of a search criterion from the one or more search criteria; and
  providing, in response to the selected search criterion, one or more search results for display on the display screen of the user device.

8. The method of claim 1, wherein determining the one or more search queries further includes:
  obtaining metadata associated with the selected portion of the content;
  obtaining a weight for the metadata; and
  determining, based on the weight for the metadata, the one or more search queries.

9. The method of claim 1, wherein determining the one or more search queries further includes:
  obtaining context data associated with the selected portion of the content;
  obtaining a weight for the context data; and
  determining, based on the weight for the context data, the one or more search queries.

10. A system comprising:
  one or more computers configured to perform operations comprising:
    providing content for display on a display screen of a user device;
    receiving gesture data from a user, wherein the gesture data is associated with a user selection of a portion of the displayed content;
    identifying, in response to receiving the gesture data, a plurality of objects in the selected portion of the displayed content, wherein the plurality of objects includes a first object having a first object type and a second object having a second object type;
    determining one or more search queries, wherein determining the one or more search queries includes:
      identifying one or more first topics from the first object and one or more second topics from the second object,
      determining a respective first weight for each of the first topics and a respective second weight for each of the second topics based on a plurality of criteria including the respective object types of the first object and the second object, and
      determining the one or more search queries based on the one or more first topics, the one or more second topics, the respective first weights, and the respective second weights; and
    providing, in response to the one or more search queries, one or more search results for display on the display screen of the user device.

11. The system of claim 10, wherein the one or more computers are configured to perform operations further comprising obtaining the provided content from one or more sources remote from the user.

12. The system of claim 10, wherein the one or more computers are configured to perform operations further comprising activating a search mode of operation prior to receiving the gesture data.

13. The system of claim 10, wherein the gesture data comprises user input defining the user selection of the portion of the displayed content.

14. The system of claim 10, wherein receiving the gesture data comprises sensing a path using a touch sensitive sensor.

15. The system of claim 10, wherein identifying the plurality of objects in the selected portion of the displayed content comprises parsing the selected portion of the displayed content provided on the display screen, the selected portion of the displayed content including text, image, audio, video, and combinations thereof.

16. The system of claim 10, wherein determining the one or more search queries further includes:
  obtaining metadata associated with the selected portion of the content;
  obtaining a weight for the metadata; and
  determining, based on the weight for the metadata, the one or more search queries.

17. The system of claim 10, wherein determining the one or more search queries further includes:
  obtaining context data associated with the selected portion of the content;
  obtaining a weight for the context data; and
  determining, based on the weight for the context data, the one or more search queries.

18. A non-transitory computer-readable medium storing instructions that, when executed by one or more processors, cause the one or more processors to perform operations comprising:
  providing content for display on a display screen of a user device;
  receiving gesture data from a user, wherein the gesture data is associated with a user selection of a portion of the displayed content;
  identifying, in response to receiving the gesture data, a plurality of objects in the selected portion of the displayed content, wherein the plurality of objects includes a first object having a first object type and a second object having a second object type;

determining one or more search queries, wherein determining the one or more search queries includes:
identifying one or more first topics from the first object and one or more second topics from the second object,
determining a respective first weight for each of the first topics and a respective second weight for each of the second topics based on a plurality of criteria including the respective object types of the first object and the second object, and
determining the one or more search queries based on the one or more first topics, the one or more second topics, the respective first weights, and the respective second weights, and
providing, in response to the one or more search queries, one or more search results for display on the display screen of the user device.

19. The non-transitory computer-readable medium of claim 18, storing instructions that, when executed by one or more processors, cause the one or more processors to perform operations further comprising obtaining the provided content from one or more sources remote from the user device.

20. The non-transitory computer-readable medium of claim 18, storing instructions that, when executed by one or more processors, cause the one or more processors to perform operations further comprising activating a search mode of operation prior to receiving the gesture data.

21. The non-transitory computer-readable medium of claim 18, wherein receiving the gesture data comprises receiving user input defining the user selection of the portion of the displayed content.

22. The non-transitory computer-readable medium of claim 18, wherein receiving the gesture data comprises sensing a path using a touch sensitive sensor.

23. The non-transitory computer-readable medium of claim 18 wherein identifying the plurality of objects in the selected portion of the displayed content comprises parsing the selected portion of the displayed content provided on the display screen, the selected portion of the displayed content including text, image, audio, video, and any combination thereof.

24. The non-transitory computer-readable medium of claim 18, storing instructions that, when executed by one or more processors, cause the one or more processors to perform operations further comprising:
generating, in response to receiving the gesture data from the user, one or more search criteria;
providing the one or more search criteria on the display screen of the user device; receiving user selection of a search criterion from the one or more search criteria; and
providing, in response to the selected search criterion, one or more search results for display on the display screen of the user device.

* * * * *